(12) United States Patent
Tanaka

(10) Patent No.: US 10,007,415 B2
(45) Date of Patent: Jun. 26, 2018

(54) DOCUMENT MANAGEMENT PROGRAM WITH DRAG AND DROP OPERATIONS FOR PROCESSING CONTENT

(71) Applicant: CANON KABUSHIKI KAISHA, Tokyo (JP)

(72) Inventor: Yusuke Tanaka, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 120 days.

(21) Appl. No.: 14/446,108

(22) Filed: Jul. 29, 2014

(65) Prior Publication Data
US 2015/0039997 A1 Feb. 5, 2015

(30) Foreign Application Priority Data

Jul. 31, 2013 (JP) .................. 2013-159179

(51) Int. Cl.
*G06F 17/00* (2006.01)
*G06F 3/0486* (2013.01)
*G06F 17/30* (2006.01)

(52) U.S. Cl.
CPC ...... *G06F 3/0486* (2013.01); *G06F 17/30126* (2013.01)

(58) Field of Classification Search
CPC .................................................. G06F 3/0486
See application file for complete search history.

(56) References Cited

U.S. PATENT DOCUMENTS

2004/0254913 A1* 12/2004 Bernstein .......... G06F 17/30902
2009/0064284 A1* 3/2009 Poston ................. G06F 21/10
  726/4
2010/0005138 A1* 1/2010 Manzano ............. G06F 3/0486
  709/203

(Continued)

FOREIGN PATENT DOCUMENTS

JP 2010020645 A 1/2010
JP 2012216222 A 11/2012

(Continued)

OTHER PUBLICATIONS

Tong, "Case Study: Drag and Drop Download in Chrome" HTML5 Rocks, Published: Sep. 25, 2010, p. 1-10, retrieved from http://www.html5rocks.com/en/tutorials/casestudies/box_dnd-_download/.*

(Continued)

*Primary Examiner* — Amelia Tapp
(74) *Attorney, Agent, or Firm* — Canon U.S.A., Inc. IP Division

(57) ABSTRACT

A first extension program and a second extension program operate on a web browser. The first extension program displays a content managed by a document management server in a display area, and when the content has been dragged outside the display area, writes information of the dragged content in a bridge data storage unit. The second extension program generates a drag object including the content information written in the bridge data storage unit and monitors whether the drag object has been dropped outside the web browser. When the drag object is dropped outside the web browser, the second extension program executes download processing by using the content information included in the drag object.

10 Claims, 17 Drawing Sheets

(56) References Cited

U.S. PATENT DOCUMENTS

2015/0193108 A1* 7/2015 Li .................. G06F 3/0486
715/748

FOREIGN PATENT DOCUMENTS

| JP | 2012226579 A | 11/2012 |
| JP | 2012-243145 A | 12/2012 |
| WO | WO2008/029774 A1 | 3/2008 |

OTHER PUBLICATIONS

De Boor, "Drag and drop attachments to save them to your desktop" Aug. 3, 2010, Official Gmail Blog, p. 1-3, retrieved from http://gmailblog.blogspot.com/2010/08/drag-and-drop-attachments-to-save-them.html.*

* cited by examiner

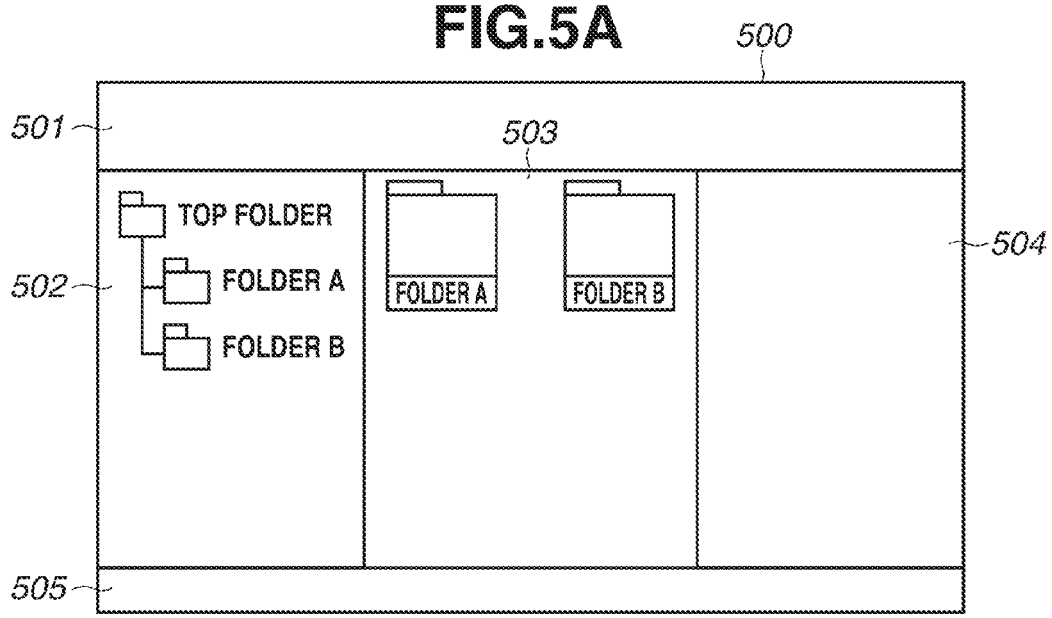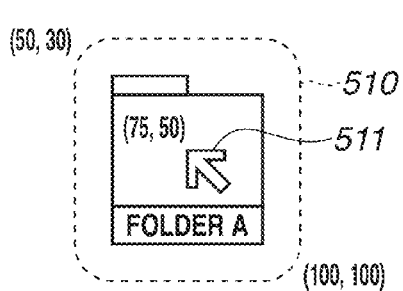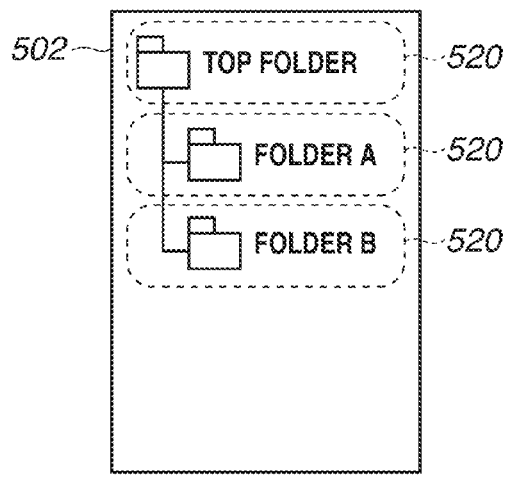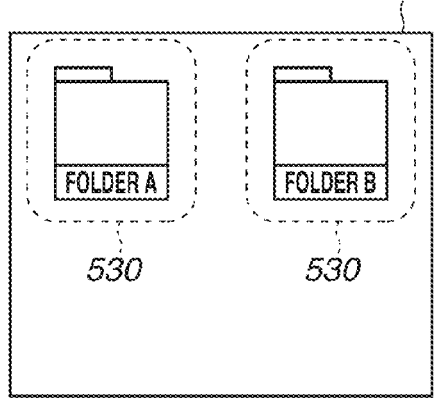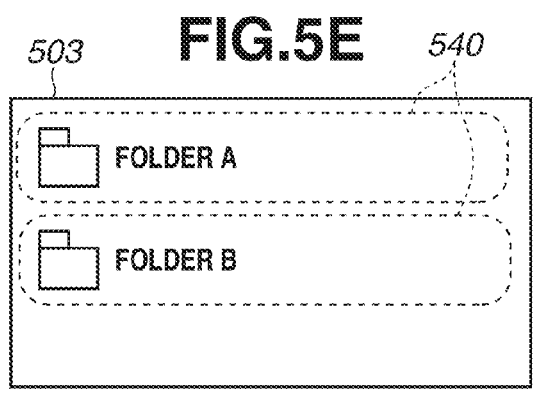

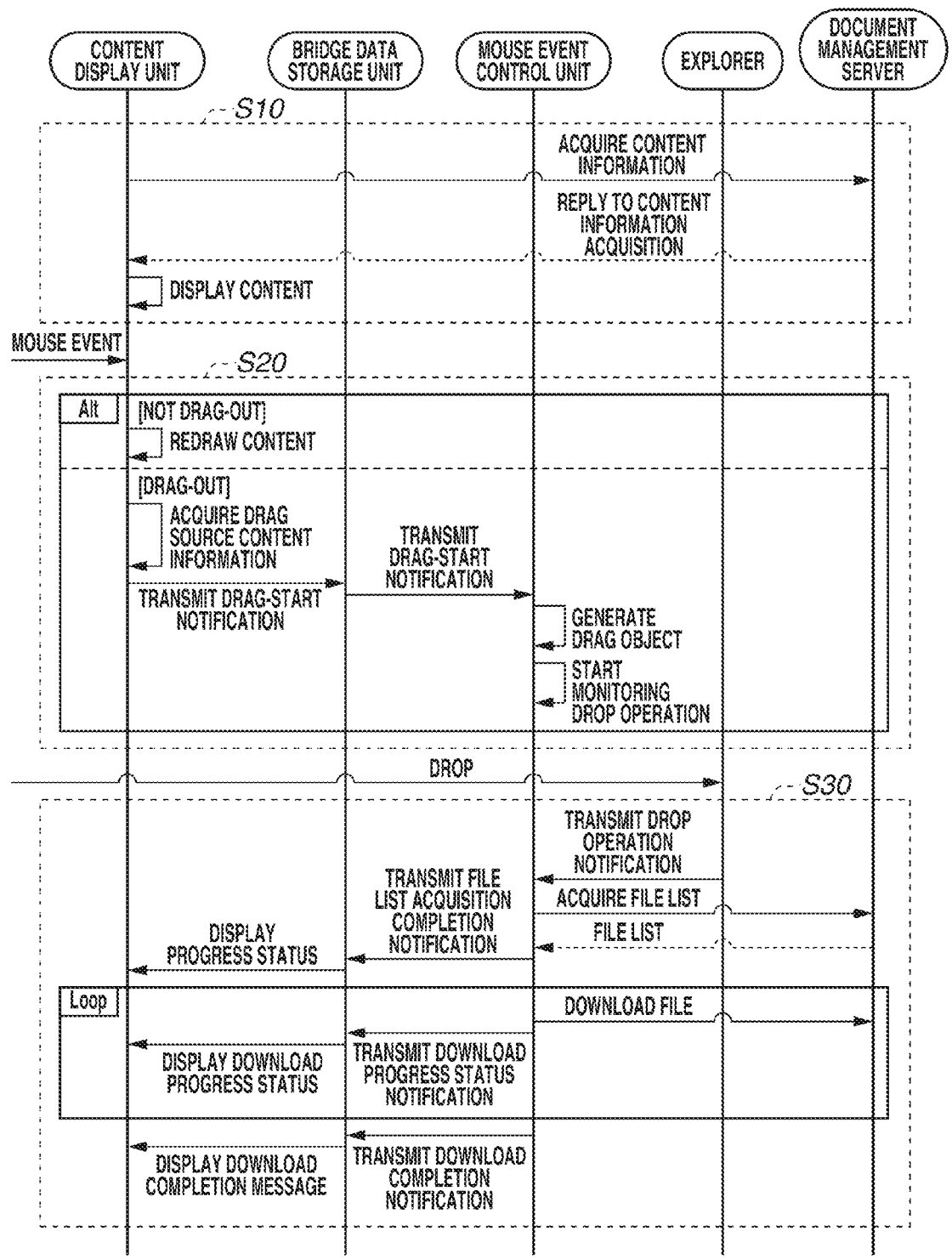

DOCUMENT MANAGEMENT PROGRAM WITH DRAG AND DROP OPERATIONS FOR PROCESSING CONTENT

BACKGROUND OF THE INVENTION

Field of the Invention

The present invention relates to a storage medium for storing a document management program for processing a document managed by a document management server, and to an information processing apparatus.

Description of the Related Art

In recent document management systems, it is demanded to access a document management server by using a general web browser (such as Microsoft Internet Explorer (trademark)) without using a dedicated document management client application. Meanwhile, the document management server classifies document files by using a hierarchical structure of a plurality of folders. Even when a user accesses the document management server by using a web browser, it is desirable for the user to be able to interactively operate on the hierarchical folder structure. Accordingly, an extension program for operating on the hierarchical folder structure of the document management server may be executed on the web browser by using a Rich Internet Application (RIA), such as Adobe Flash Player (trademark).

In WO 2008/029774, FIG. 9 illustrates a state where a hypertext markup language (HTML) object (an area for uploading) including an upload path to a server is displayed in advance on a web browser. When a user drags a file managed by a file system of an operating system (OS) and then drops the file onto the HTML object (a drag & drop operation is hereinafter referred to as a D&D operation), the file is uploaded to a storage area corresponding to the upload path included in the HTML object. However, a technique discussed in WO 2008/029774 allows a file to be uploaded to only one storage area specified by the upload path associated with the HTML object. Since the technique discussed in WO 2008/029774 allows a file to be uploaded to one storage area specified by the upload path, even if the hierarchical folder structure is displayed by using the RIA, the user cannot upload, through the D&D operation, a file on the OS to a desired folder in the displayed hierarchical folder structure. Meanwhile, Japanese Patent Application Laid-Open No. 2012-243145 discusses a technique for uploading, through the D&D operation, a file on an OS to a folder on a hierarchical folder structure displayed by using the RIA. The technique is achieved by providing an add-on described by using the RIA for displaying the hierarchical folder structure, an add-on described by using ActiveX technique for acquiring and storing information of a mouse event which occurred in the OS, and a script program described with JavaScript (registered trademark) to relay mouse event information between the two add-ons.

According to the technique discussed in WO 2008/029774, when the user drags an HTML object displayed by the web browser to the outside of the display area of the web browser, an add-in program then generates a drag object of the OS and registers the generated drag object to the OS. Thereby, downloading of the HTML object is performed through the D&D operation.

However, according to the technique discussed in WO 2008/029774, the download target is an HTML object displayed by the web browser. Therefore, with the technique discussed in WO 2008/029774, it is not possible to download a content (file or folder) displayed by an RIA, such as Adobe Flash Player (trademark), through the D&D operation.

Japanese Patent Application Laid-Open No. 2012-243145 discusses a technique for identifying an upload destination folder by notifying Flash Player of coordinates of the position on the web browser at which a file on the OS is dropped, as described above. However, Japanese Patent Application Laid-Open No. 2012-243145 does not discusses a configuration for downloading. Specifically, since Japanese Patent Application Laid-Open No. 2012-243145 discusses a configuration for uploading data, it cannot be applied as it is as a configuration for downloading a content displayed by the RIA, such as a Flash Player, through the D&D operation.

SUMMARY OF THE INVENTION

According to an aspect of the present invention, a document management program according to the present invention includes a first extension program and a second extension program operating on a web browser. The first extension program causes a computer to function as a first acquisition unit configured to acquire information of a content managed by a document management server, a display unit configured to, according to the information acquired by the first acquisition unit, display the content managed by the document management server in a display area defined on the web browser, and, a first storage unit configured to, when mouse event information which occurred on the web browser is determined to be drag-out indicating that the content displayed by the display unit has been dragged outside the display area, write information of the dragged content in a bridge data storage unit. The second extension program causes the computer to function as a monitoring unit configured to receive the information of the content written in the bridge data storage unit, generate a drag object including the received content information, and monitor whether the drag object has been dropped outside the web browser, and a downloading unit configured to, when the drag object is dropped outside the web browser, execute download processing by instructing the document management server to transmit a corresponding content by using the information of the content included in the drag object.

Further features of the present invention will become apparent from the following description of exemplary embodiments with reference to the attached drawings.

BRIEF DESCRIPTION OF THE DRAWINGS

FIGS. 5A, 5B, 5C, 5D, and 5E is a diagram each illustrating user interface (UI) structures.

FIG. 6 is a main sequence diagram illustrating processing for acquiring a mouse event and downloading a file.

DESCRIPTION OF THE EMBODIMENTS

Various exemplary embodiments, features, and aspects of the invention will be described in detail below with reference to the drawings.

<System Configuration>

Figure 1:
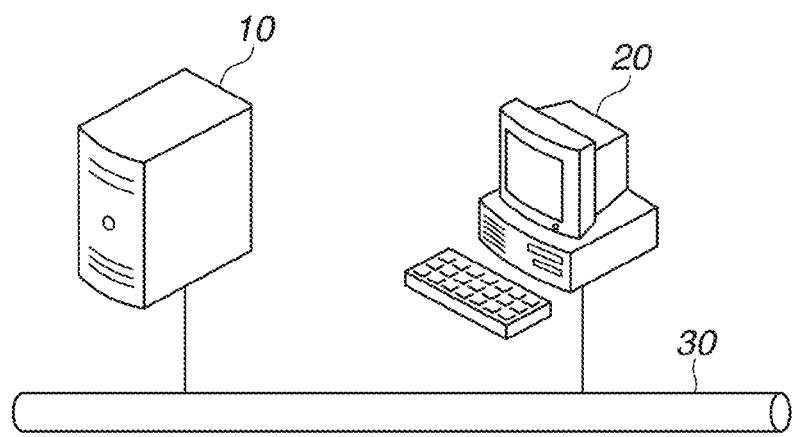
FIG. 1 is a diagram illustrating a system configuration.

FIG. 1 is a diagram illustrating a configuration of a document management system according to exemplary embodiments of the present invention. The document management system includes a document management server personal computer (PC) 10 and a client PC 20 which are connected each other via a local area network (LAN) 30. The document management server PC 10 provides a document management function for managing contents, such as files and folders, and a web application server function. Although, according to the present exemplary embodiment, the document management function and the web application server function are implemented within an identical server, these functions may be separately implemented in different servers. The client PC 20 provides a function for connecting with the document management server PC 10 and operating a content via a web browser.

<Hardware Configuration>

Figure 2:
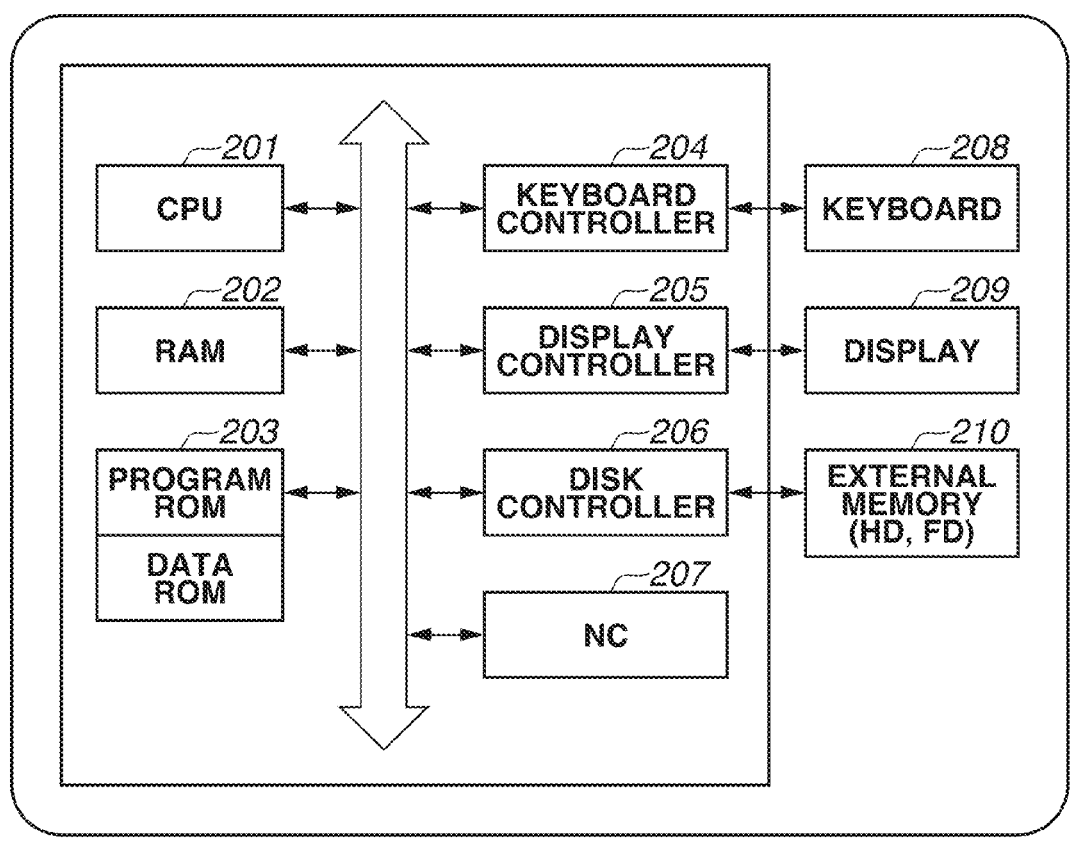
FIG. 2 is a diagram illustrating an example hardware configuration of a document management server and a document management client.

FIG. 2 is a diagram illustrating an example hardware configuration of each PC which constitutes the document management system according to an exemplary embodiment of the present invention. The document management server PC 10 and the client PC 20 can be constituted by using general PC hardware.

A central processing unit (CPU) 201 functions as a processing unit for executing each process of each flowchart described below by executing a program, such as an OS and an application, stored in a read only memory (ROM) 203 or an external memory 210, such as a hard disk. A random access memory (RAM) 202 functions as a main memory for the CPU 201, and a work area. A keyboard controller 204 controls an input from a keyboard 208 and a pointing device (not illustrated). A display controller 205 controls display of various displays 209. A disk controller 206 controls data access in the external memory 210 (such as a hard disk) storing various data. A network controller (NC) 207 is connected to a network, and performs processing for controlling communication with other apparatuses connected to the network.

<Software Configuration>

Figure 3:
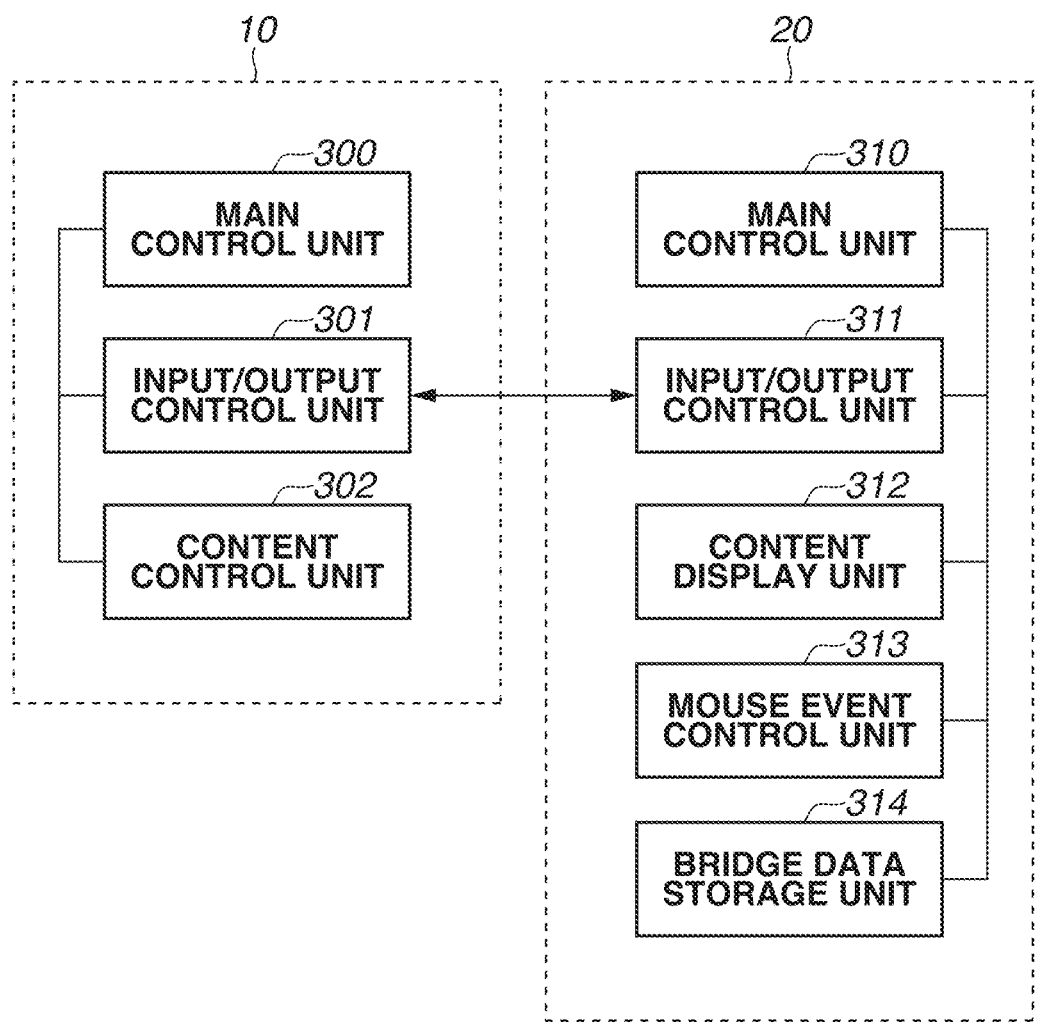
FIG. 3 is a diagram illustrating an example configuration of each processing unit in the document management server and the document management client.

FIG. 3 is a diagram illustrating an example configuration of each processing unit of the document management server PC 10 and the client PC 20.

When the CPU 201 of the document management server PC 10 executes a program, the document management server PC 10 functions as processing units 300 to 302. Information, such as a content, is stored in the external memory 210, and, when necessary, is loaded into the RAM 201 and processed.

A main control unit 300 in the document management server PC 10 performs main control processing for managing applications of the document management server PC 10. The main control unit 300 controls an input/output control unit 301 and a content control unit 302, and transfers content information between the units. The input/output control unit 301 receives a command request from the client PC 20, and transmits a command response to the client PC 20. The content control unit 302 acquires content information requested by the client PC 20. The content information may be managed in a database (DB) and a file, and not be limited to any specific form.

When the CPU 201 of the client PC 20 reads and executes a program of each processing unit, the client PC functions as processing units 310 to 314.

The main control unit 310 of the client PC 20 performs main control processing for managing applications of the client PC 20. The main control unit 310 controls an input/output control unit 311, a content display unit 312, a mouse event control unit 313, and a bridge data storage unit 314, and transfers the content information between the units. The input/output control unit 311 transmits a command request to the document management server PC 10, and receives a command response from the document management server PC 10.

The content display unit 312 interprets the content information received from the document management server PC 10, and displays the content information on the web browser 400. A content refers to a file, such as a document, and a folder for managing files. The content display unit 312 detects whether mouse coordinates (a coordinate position pointed by a pointing device) acquired by the mouse event control unit 313 are overlapped with a display position of any one of displayed contents. If the mouse event control unit 313 fails in processing, the content display unit 312 displays an error message indicating the failure. Further, the content display unit 312 provides an interface for communicating with the web browser 400. Further, the content display unit 312 implements acquiring a mouse event (such as a drag-start event and a drag-out event of a content) which occurred within the web browser 400, and storing mouse event information.

The mouse event control unit 313 acquires the mouse event information based on the mouse event (event of a pointing device) received from a program (such as the OS) different from the web browser 400. Based on the acquired mouse event information, the mouse event control unit 313 determines an event type, a coordinate position, and which file is currently dragged. When uploading a file, the mouse event control unit 313 uploads the file set in a drag source to a folder which is detected to be overlapped with the mouse coordinates of when the file is dropped in the content display unit 312. When downloading a file, on the other hand, the mouse event control unit 313 detects a file drop operation onto a folder on the OS of the client PC 20, and downloads a content of the dropped file from the document management server PC 10 to the drop destination folder. A program for implementing the mouse event control unit 313 provides an interface for communicating with the web browser 400 via JavaScript (registered trademark) to notify the bridge data storage unit 314 that information has been set.

The bridge data storage unit 314 stores information for transmitting and receiving folder information displayed by the content display unit 312 and the mouse event information to/from the mouse event control unit 313. Further, a program for implementing the bridge data storage unit 314 provides an interface for transmitting and receiving the mouse event information and the folder information to/from the web browser 400.

Figure 4:
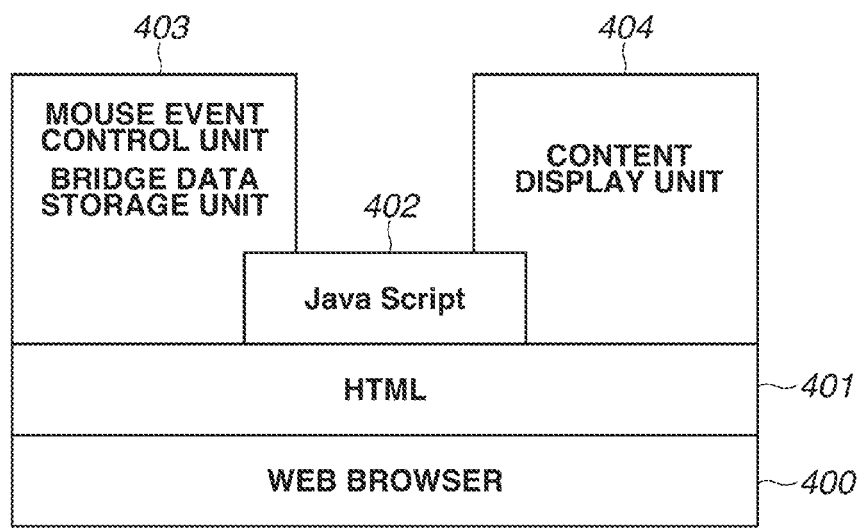
FIG. 4 is a diagram illustrating a web browser configuration.

FIG. 4 is a diagram illustrating a configuration of an add-on program (a document management program for operating a computer as the content display unit 312, the mouse event control unit 313, and the bridge data storage unit 314) to be executed on the web browser 400 according to a first exemplary embodiment of the present invention.

The web browser 400 is an application for providing a function of interpreting an HTML object, a function of executing JavaScript (registered trademark), and an add-on function as an external extension function.

The HTML 401 is a markup language for describing web pages supported by the web browser 400.

JavaScript (registered trademark) 402 is a program (script program) described in a script language supported by the web browser 400, and provides the web browser 400 with the following functions. The provided functions includes a function for receiving mouse event information from the mouse event control unit 313, a function for setting information to the bridge data storage unit 314, a function for acquiring information stored in the bridge data storage unit 314, and a function for setting, to the content display unit 312, information acquired from the bridge data storage unit 314.

External extension function add-ons 403 and 404 are extension programs (add-on programs) for extending the functions of the web browser 400. The external extension function add-on 403 is an add-on program for providing the functions of the mouse event control unit 313 and the bridge data storage unit 314. The external extension function add-on 404 is an add-on program for providing functions of the content display unit 312.

The external extension function add-on 404 is a program described with the RIA, such as Adobe Flash (trademark), which operates on the web browser 400, and provides the functions (user interface function) of the content display unit 312. According to the description of an HTML web page read from the document management server PC 10, the web browser 400 defines, in a window thereof, a display area for displaying a screen defined by the external extension function add-on 404. Then, a screen (a UI, such as a main screen 500 illustrated in FIG. 5A) defined by the external extension function add-on 404 is displayed in the display area on the web browser 400. Specifically, the content display unit 312 implemented by the external extension function add-on 404 displays a hierarchical file and folder structure, which is managed by the document management server PC 10, in the main screen 500 displayed in the window of the web browser 400.

The external extension function add-on 403 is a program for implementing, by using ActiveX technique, a function for acquiring mouse event information based on a mouse event which occurred in the OS (an external application different from the web browser 400), and a function for storing the mouse event information. Further, the external extension function add-on 403 transmits and receives mouse event information and the folder information displayed on the main screen 500 to/from the external extension function add-on 404 via JavaScript (registered trademark) 402. In response to the D&D operation for dragging a file displayed on the main screen 500 and dropping the file onto a desired folder managed by the OS, the external extension function add-on 403 allows the file being managed by the document management server PC 10 to be downloaded to the client PC 20.

The main screen 500 illustrated in FIG. 5A displayed on the window of the web browser 400 by the content display unit 312 includes a header display area 501, a tree display area 502, a content display area 503, a property display area 504, and a footer display area 505.

The content display unit 312 displays a name of a document management system and a menu in the header display area 501. The content display unit 312 hierarchically displays folders for storing files (documents) in the tree display area 502. Further, the content display area 503 displays documents and folders stored in a folder selected in the tree display area 502. The main screen 500 illustrated in FIG. 5A indicates a display example of the content display area 503 in a case where a "top folder" is selected in the tree display area 502. The content display unit 312 can switch the display format of the content display area 503 between icon display and list display by operating a switching button. The property display area 504 displays a property of a content (file or folder) selected in the content display area 503. The Property includes a name and a path of the content. The footer display area 505 displays information on the application version, copyrights and the like.

When downloading a content, a download target content is determined based on the mouse coordinates when a drag operation is performed. Folders to be displayed in the tree display area 502 or folders and files to be displayed in the content display area 503 can be contents subjected to the D&D operation as download targets.

When uploading a content, an upload destination folder is determined based on the mouse coordinates of when a drop operation is performed. The content display unit 312 acquires a coordinate position based on the mouse event information, and detects whether the acquired mouse coordinates are overlapped with the display position of any one of folders displayed in the tree display area 502 and the content display area 503. FIG. 5B is a diagram illustrating an example of coordinate information defined for one of folders displayed in the tree display area 502 and the content display area 503. A folder display area 510 is an area defined to detect whether the mouse coordinates are overlapped with the display position of any one of the displayed folders. The top left corner of the area is stored as a starting point, and the bottom right corner thereof is stored as an ending point. When mouse coordinates 511 are included in the folder display area 510, the content display unit 312 determines that the mouse coordinates are overlapped with the display position of the folder. The defined shape of the folder display area 510 varies according to the display area and display format of the folder. For example, the folder display area 510 defined for folders displayed in the tree display area 502 is defined as a rectangular area 520 which encloses a folder icon and a folder name, as illustrated in FIG. 5C. When the content display area 503 is displayed in the icon display, the folder display area 510 defined for each folder displayed in the content display area 503 is defined as an area 530, as illustrated in FIG. 5D. When the content display area 503 is displayed in the list display, the folder display area 510 defined for each folder displayed in the content display area 503 is defined as an area 540, as illustrated in FIG. 5E.

<<Description of Processing>>

Processing procedures performed by the document management system according to the first exemplary embodiment will be described below with reference to FIGS. 6 to 9.

FIG. 6 is a sequence diagram illustrating processing in which the web browser 400 displays a content managed by the document management server PC 10 by using the RIA, such as Adobe Flash, and a dragged content is downloaded to a folder on the OS of the client PC 20. This processing is roughly divided into three: processing for displaying a content managed by the document management server PC 10 (step S10), processing for responding to a drag operation for a content displayed by the RIA (step S20), and processing for responding to a drop operation for the content onto a folder on the OS and downloading the content (file) to the folder (step S30). Each processing will be described in detail below.

In step S10, the content display unit 312 acquires content information (including folder information and file information) from the document management server PC 10. The content information collectively includes a name of a content and a unique identifier (ID) for identifying the content. The unique information for identifying a content may be a path. A plurality of pieces of content information can be simultaneously acquired. Based on the acquired content information, the content display unit 312 displays the content in the tree display area 502 and the content display area 503. Although the position and size for displaying content may be defined in the content display unit 312 as an internal resource or defined in an external file.

In step S20, upon acquisition of a mouse event, the content display unit 312 branches to different processing according to an event type of the acquired mouse event information. Specifically, the content display unit 312 changes the processing according to whether the mouse event information indicates that the content has been dragged to the outside of the main screen 500 (drag-out) or dragged within the main screen 500. When the mouse event information does not indicate "drag-out", which indicates that the content has been dragged to the outside of the main screen 500 (i.e., when the content is dragged within the main screen 500), the content display unit 312 redraws the content at a position according to the drag operation. On the other hand, when the mouse event information indicates "drag-out", the content display unit 312 acquires content information of the drag target content, and transmits the content information to the bridge data storage unit 314 to notify the bridge data storage unit 314 of "drag-start". Further, the bridge data storage unit 314 transmits the received content information to the mouse event control unit 313 to notify the mouse event control unit 313 of the "drag-start". The mouse event control unit 313 generates a drag object including the received content information, and starts monitoring the drop operation to the outside of the web browser 400 (i.e., a folder on the OS).

When the drop operation to the outside of the web browser 400 (i.e., a folder on the OS) is performed, in step S30, the mouse event control unit 313 detects the drop operation by the mouse based on a notification from the OS (Explorer). Specifically, the mouse event control unit 313 acquires folder path information corresponding to the content download destination determined based on the mouse coordinates of when the content is dropped. When the dropped content is a folder, the mouse event control unit 313 transmits the content information of the dropped folder to the document management server PC 10, and receives a content list (a list of files included in the folder). Then, the mouse event control unit 313 instructs the document management server PC 10 to transmit files included in the content list to execute download processing. When the dropped content is a file, the mouse event control unit 313 transmits the content information of the file to the document management server PC 10 to instruct the document management server PC 10 to execute the download processing for the file. During execution of this series of processing, the mouse event control unit 313 transmits progress status notifications (a file list acquisition notification, a download progress status notification, and a download completion notification) to the content display unit 312 via the bridge data storage unit 314. Based on the information of the received progress status notifications, the content display unit 312 displays a progress status on the main screen 500.

Processing in the above-described steps S10 to S30 will be described in detail below with reference to the flowcharts described below.

<Processing for Displaying Content Managed by Document Management Server PC 10 (Step S10)>

Figure 7:
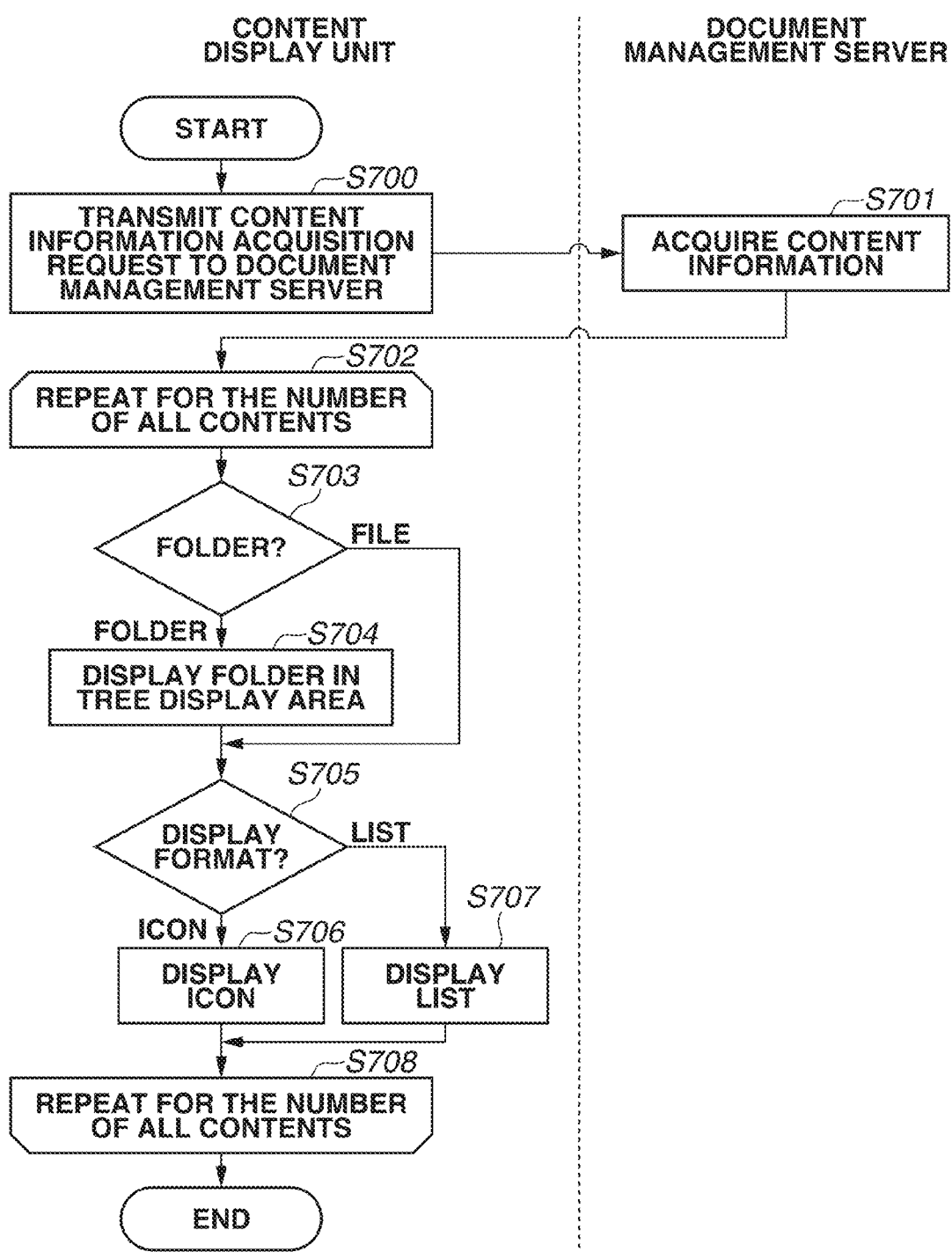
FIG. 7 is a flowchart illustrating processing for displaying contents according to a first exemplary embodiment.

FIG. 7 is a flowchart illustrating in detail the processing in step S10 in which the content display unit 312 acquires content information including folder information and file information from the document management server PC 10, and displays the acquired content information on the main screen 500 on the web browser 400.

In step S700, the content display unit 312 generates a content information acquisition request, and transmits the generated content information acquisition request to the document management server PC 10.

In step S701, upon reception of the content information acquisition request, the content control unit 302 of the document management server PC 10 acquires content information, and transmits the acquired content information to the content display unit 312 as a response.

Step S702 illustrated in FIG. 7 indicates the start of a loop. In step S702, the content display unit 312 repeats processing in steps S703 to S707 for the number of all contents acquired from the document management server PC 10.

In step S703, the content display unit 312 determines whether the acquired content information is folder information. When the acquired content information is determined to be folder information (FOLDER in step S703), then in step S704, the content display unit 312 displays a folder icon in the tree display area 502 based on the acquired folder information. On the other hand, when the acquired content information is determined to be file information (FILE in step S703), the processing proceeds to step S705.

In step S705, the content display unit 312 determines the display format set for the content display area 503. When the display format is determined to be the an icon format (ICON in step S705), then in step S706, the content control unit 312 displays, in the icon format, the content corresponding to the acquired content information in the content display area 503. On the other hand, when the display format is determined to be the a list format (LIST in step S705), then in step S707, the content control unit 312 displays, in the list format, the content corresponding to the acquired content information in the content display area 503.

Step S708 illustrated in FIG. 7 indicates the end of the loop. In step S708, when the content display unit 312 completes the processing in steps S703 to S707 for the number of all contents acquired from the document management server PC 10, the processing exits the loop and is then ended the flowchart illustrated in FIG. 7.

<Processing when Content Displayed by RIA is Dragged (Step S20)>

Figure 8:
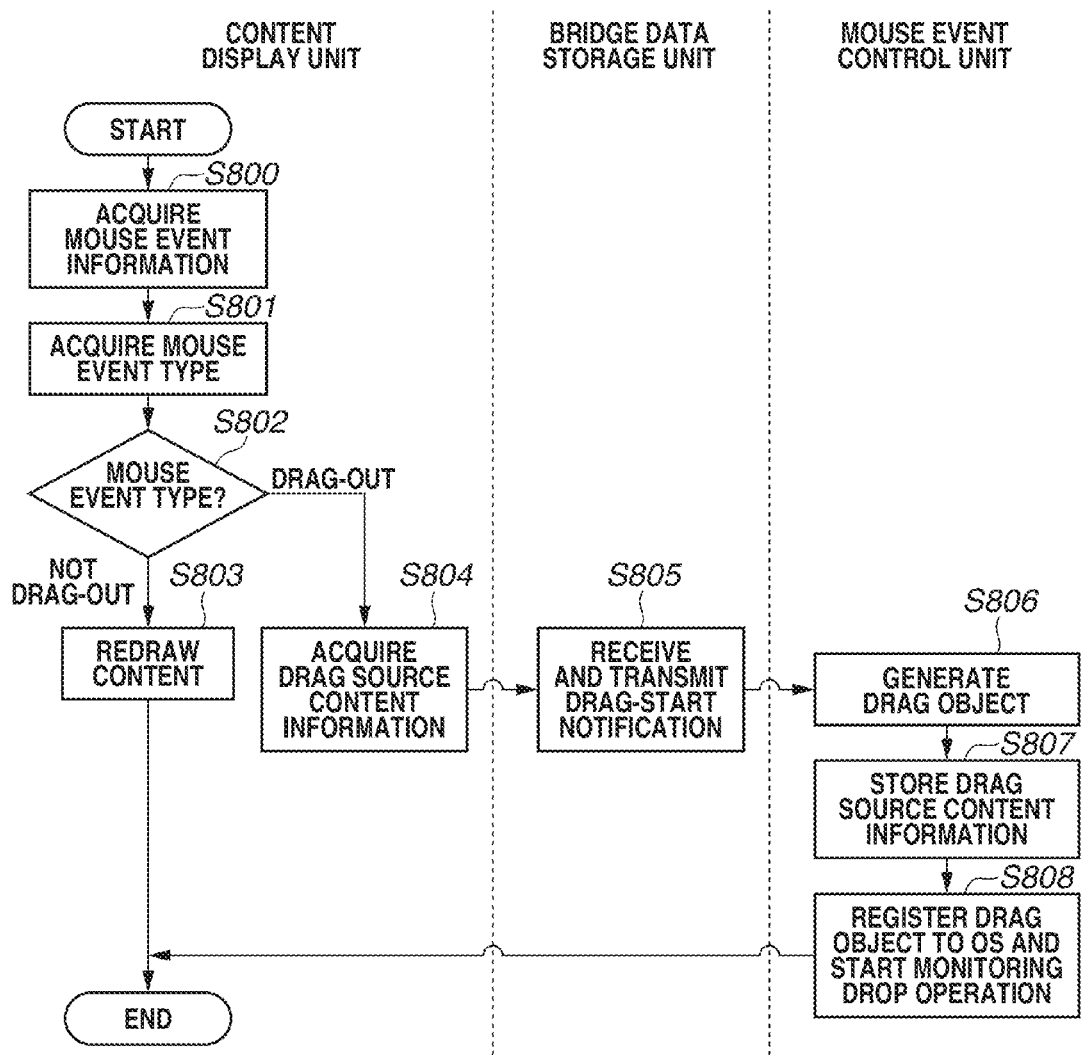
FIG. 8 is a flowchart illustrating processing performed when a content is dragged according to the first exemplary embodiment.

FIG. 8 is a flowchart illustrating in detail the processing in step S20 performed when a content displayed in the main screen 500 by the RIA executed on the web browser 400 is dragged. In particular, this flowchart illustrates the processing in which the mouse event control unit 313 starts monitoring a drop operation when the content is dragged to the outside of the main screen 500 of the web browser 400.

In step S800, the content display unit 312 acquires mouse event information relating to the main screen 500 based on a mouse event which occurred in the web browser 400. In step S801, the content display unit 312 acquires the mouse event type included in the acquired mouse event information.

In step S802, when the mouse event control unit 313 determines that the mouse event type is not "drag-out" (for example, a drag operation in the main screen 500) (NOT DRAG-OUT in step S802), the processing proceeds to step S803. On the other hand, when the mouse event control unit 313 determines that the mouse event type is "drag-out" for dragging the content to the outside of the main screen 500 (DRAG-OUT in step S802), the processing proceeds to step S804.

In step S803, according to the mouse event (such as, the drag operation in the main screen 500) performed, the content display unit 312 redraws the content, ends processing, and waits for the occurrence of a next mouse event.

In step S804, the content display unit 312 acquires information about the dragged-out content (drag source content information), and transmits the information to the bridge data storage unit 314. The drag source content information includes universal resource identifier (URI) information for identifying the dragged-out content (for example, universal resource locator (URL) information for identifying a content stored in the document management server PC 10) and information indicating a content type. In step S805, the bridge data storage unit 314 transmits the drag source content information received from the content display unit 312 to the mouse event control unit 313 as a drag-start notification.

In step S806, upon reception of the drag source content information as the drag-start notification from the bridge data storage unit 314, the mouse event control unit 313 generates a drag object. In step S807, the mouse event control unit 313 stores the drag source content information in the drag object. In step S808, the mouse event control unit 313 registers the drag object being set the drag source content information to the OS of the client PC 20 to start monitoring whether a drop operation has been performed outside the web browser 400.

<Processing for Downloading Content to Folder (Step S30)>

Figure 9:
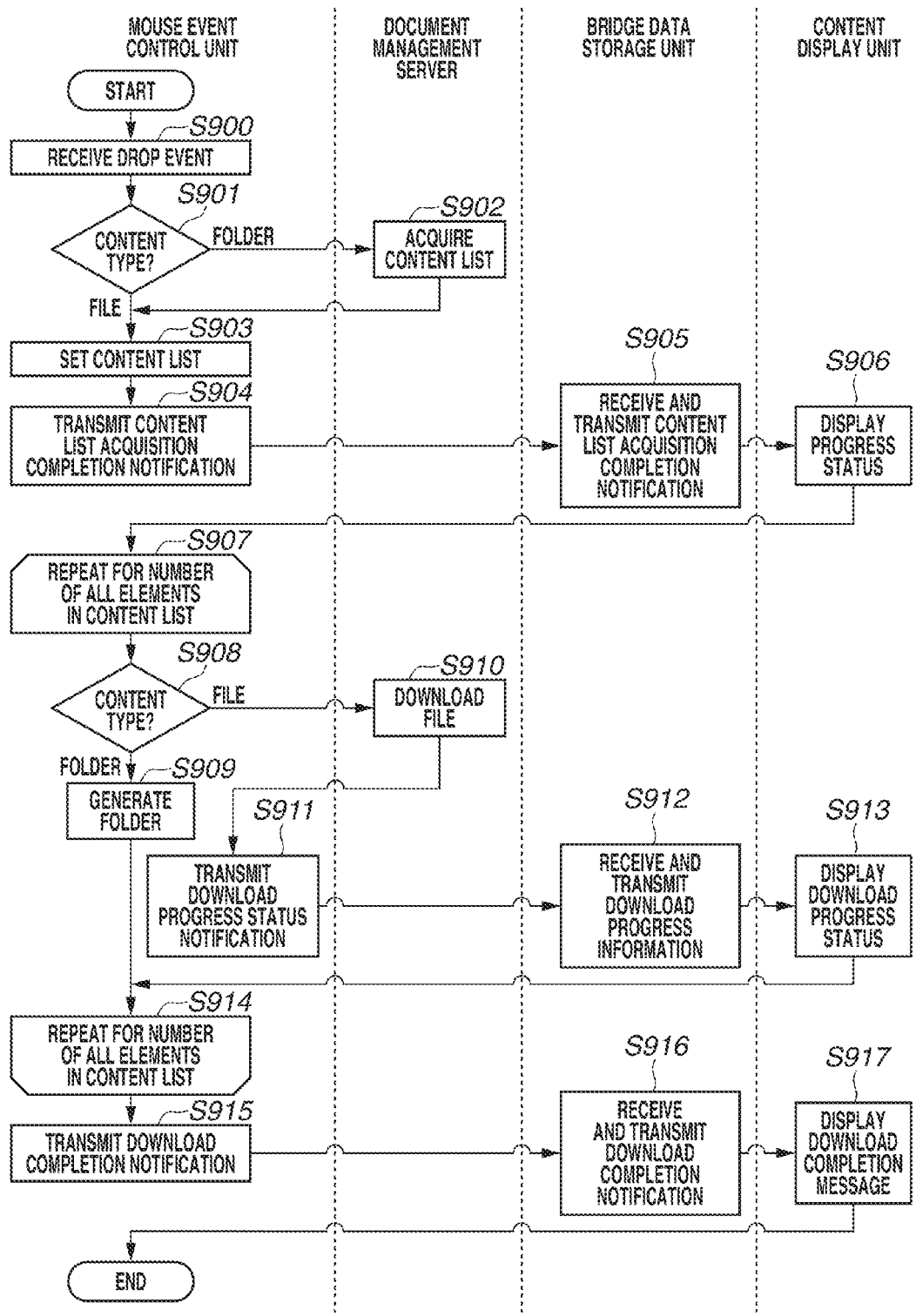
FIG. 9 is a flowchart illustrating processing for downloading contents according to the first exemplary embodiment.

FIG. 9 is a flowchart illustrating the processing for downloading a content when a content drop operation for the content is performed outside the web browser 400.

In step S900, the mouse event control unit 313 receives, from the OS, a mouse event of the drop operation for dropping a drag object. Specifically, the mouse event control unit 313 acquires folder path information corresponding to the content download destination determined based on the mouse coordinates of when the drag object is dropped.

In step S901, the mouse event control unit 313 determines whether the type of the drag source content information stored in the drag object is a folder or a file. When the type of the drag source content information is determined to be a folder (FOLDER in step S901), the mouse event control unit 313 transmits the drag source content information to the document management server PC 10 to request acquisition of a list of download target contents (content list) included in the folder. Then, the processing proceeds to step S902. On the other hand, when the type of the drag source content information is determined to be a file (FILE in step S901), the processing proceeds to step S903.

In step S902, the document management server PC 10 acquires information of all contents (content information) included under the folder identified by the drag source content information received from the mouse event control unit 313. The content information includes URI information for identifying the content. Then, the document management server PC 10 returns, to the mouse event control unit 313, a list of content information of the folder and all contents included in the folder (content list).

When the content type is a file (FILE in step S901), then in step S903, the mouse event control unit 313 sets the content information of the file as a processing target content list. When the content type is a folder (FOLDER in step S901), then step S902, the mouse event control unit 313 sets the content information list received from the document management server PC 10 as a processing target content list.

In step S904, the mouse event control unit 313 notifies the bridge data storage unit 314 of content list acquisition completion. In step S905, upon reception of the content list acquisition completion notification from the mouse event control unit 313, the bridge data storage unit 314 further transmits the content list acquisition completion notification to the content display unit 312. In step S906, based on the content list acquisition completion notification received from the bridge data storage unit 314, the content display unit 312 displays the progress status on the main screen 500.

Step S907 illustrated in FIG. 9 indicates the start of a loop. The mouse event control unit 313 repeats the processing in steps S908 to S913 for the number of all processing target contents set in the content list.

In step S908, the mouse event control unit 313 determines a type of the processing target content information. When the type of the content information is determined to be a folder (FOLDER in step S908), the processing proceeds to step S909. On the other hand, when the type of the content information is determined to be a file (FILE in step S908), the mouse event control unit 313 transmits the content information to the document management server PC 10 to instructs the document management server PC 10 to download the file. Then, the processing proceeds to step S910.

In step S909, the mouse event control unit 313 generates a new folder corresponding to the content information in a download destination folder indicated by the folder path information acquired in step S900. In this case, the download destination is changed to the generated folder.

In step S910, the document management server PC 10 identifies the download target content (file) based on the content information received from the mouse event control unit 313, and starts transmitting the identified file to the client PC 20. The file is downloaded to the download destination folder of the client PC 20.

In step S911, the mouse event control unit 313 transmits a download progress status notification to the bridge data storage unit 314. Download progress information includes, for example, the number of downloaded files and the percentage of downloaded files in the content list, and may include other information.

In step S912, upon reception of the download progress information from the mouse event control unit 313, the bridge data storage unit 314 transmits the received download progress information to the content display unit 312. In step S913, based on the download progress information received from the bridge data storage unit 314, the content display unit 312 performs control to display the progress status on the main screen 500.

Step S914 illustrated in FIG. 9 indicates the end of the loop. In step S914, when the mouse event control unit 313 completes the processing in steps S908 to S913 for the number of all contents set in the content list, the processing exits the loop and then proceeds to step S915.

In step S915, upon completion of downloading of all download target contents (files), the mouse event control unit 313 transmits a download completion notification to the bridge data storage unit 314. In step S916, upon reception of the download completion notification from the mouse event control unit 313, the bridge data storage unit 314 transmits the download completion notification to the content display unit 312. In step S917, upon reception of the download completion notification from the bridge data storage unit 314, the content display unit 312 displays a download completion message on the main screen 500.

With the above-described configuration, it becomes possible to download the content displayed by the RIA through the D&D operation.

<Changing Between Content Download Processing and Content Upload Processing>

Changing between file download processing and file upload processing through the D&D operation is performed as follows. Specifically, when a mouse event at the time of drag-start is determined to be the drag operation for the content in the main screen 500 displayed by the RIA on the web browser 400, download processing is performed by the above-described processing illustrated in FIGS. 6 to 9. On the other hand, when a mouse event at the time of drag-start is determined to be a drag operation for a file managed by the file system, such as the OS, and the mouse event is determined to be a drop operation for a folder in the main screen 500 displayed by the RIA on the web browser 400, upload processing is performed by processing illustrated in FIGS. 10 to 14 (described below). The upload processing is similar to that in Japanese Patent Application Laid-Open No. 2012-243145.

<Detailed Description of File Upload Processing>

Figure 10:
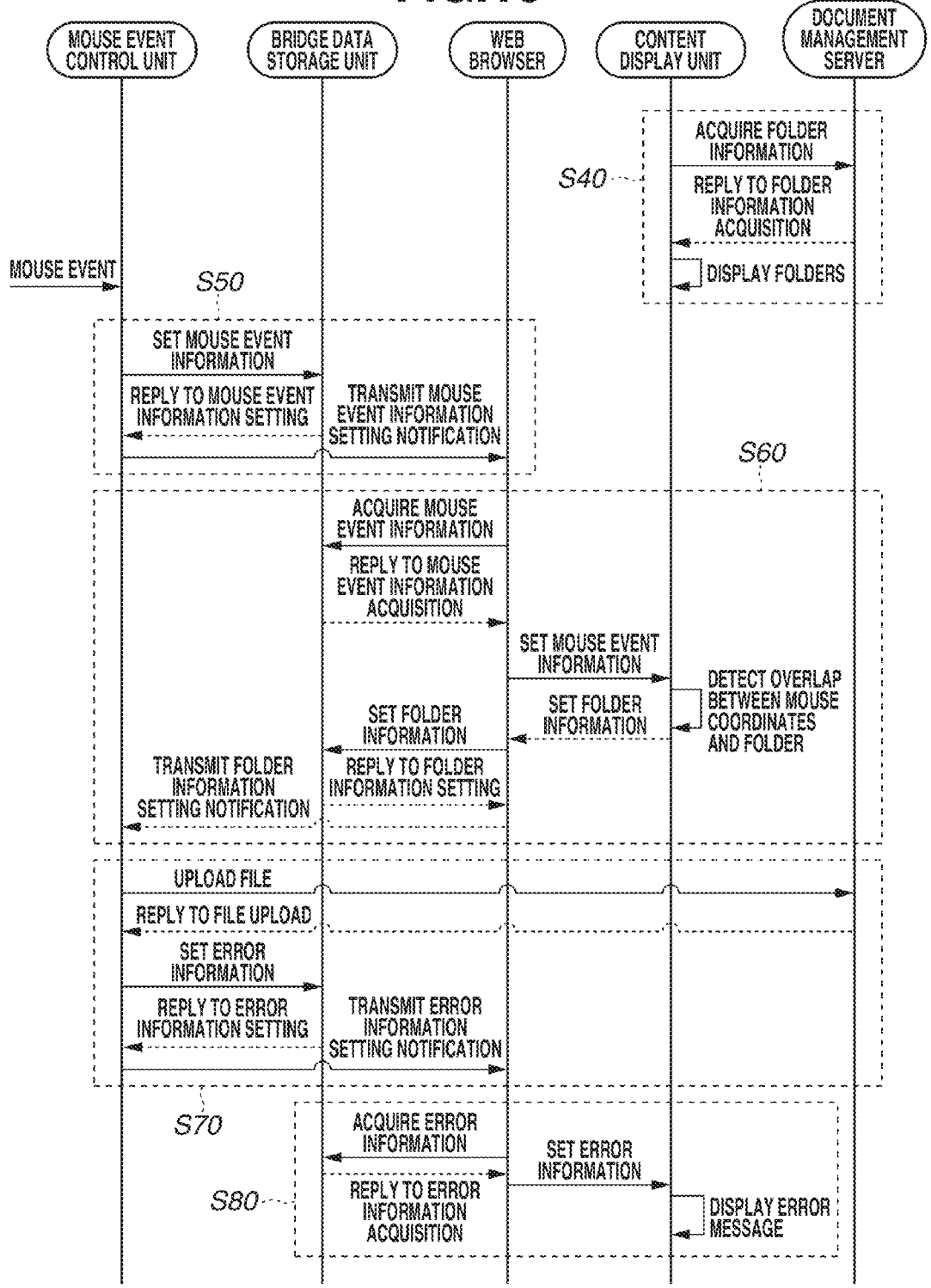
FIG. 10 is a main sequence diagram illustrating processing for acquiring a mouse event and uploading a file.

FIG. 10 is a sequence diagram illustrating processing for displaying a folder by using the RIA on the web browser 400, and then performing the D&D operation for a file managed by the OS of the client PC 20 to upload the file to a corresponding folder on the document management server PC 10.

This processing is roughly divided into five: processing for displaying a folder (step S40), processing for acquiring mouse event information (step S50), processing for detecting whether mouse coordinates are overlapped with a display position of a folder (step S60), processing for uploading a file to the folder (step S70), and processing for displaying an error message (step S80). Each processing will be described in detail below. The processing in step S40 is similar to the processing in step S10 illustrated in FIG. 6, and redundant description thereof will be omitted.

In step S50, the mouse event control unit 313 acquires a mouse event which occurred in the OS of the client PC, and, if the mouse position is determined to be within the main screen 500 based on the acquired mouse event, sets the mouse event in the bridge data storage unit 314 as mouse event information. The mouse event information includes the event type, a coordinate position, and a selected file (selected folder) currently being dragged. Event types include "drag-enter" which indicates that a selected file (folder) being dragged by the mouse has entered the main screen 500, "drag-over" which indicates that the selected file (folder) is currently being dragged by the mouse on the main screen 500, "drag-out" which indicates that the selected file (folder) being dragged by the mouse has come out from the main screen 500, and "drop" which indicates that the selected file (folder) dragged on the main screen 500 has been dropped. The mouse event control unit 313 notifies the web browser 400 that the mouse event information has been stored in the bridge data storage unit 314.

In step S60, the web browser 400 acquires the mouse event information stored in the bridge data storage unit 314, and sets the acquired mouse event information to the content display unit 312 (notifies the content display unit 312 of the acquired mouse event information). The content display unit 312 acquires the coordinate position included in the set mouse event information, and compares the acquired coordinate position with the coordinate position of a folder displayed on the main screen 500 to detect whether the mouse coordinate position is overlapped with the display position of folder. When the mouse coordinate positions is detected to be overlapped with the display position of folder, the content display unit 312 sets, to the web browser 400, folder information of the folder determined to be overlapped. The web browser 400 stores the set folder information in the bridge data storage unit 314 as upload destination folder information, and notifies the mouse event control unit 313 that the folder information has been stored in the bridge data storage unit 314. As described above, the folder information is set after the mouse coordinates are determined to be overlapped with the display position of folder. Alternatively, the folder information may be set when the content display unit 312 displays a screen for prompting the user to specify whether uploading is to be performed and receives an upload instruction from the user. Further, the folder information may not be set when the content display unit 312 receives an upload cancel instruction from the user.

In step S70, the mouse event control unit 313 acquires the upload destination folder information and information of an upload target selected file (selected folder) from the bridge data storage unit 314. The mouse event control unit 313 uploads the selected file (or folder) to the upload destination folder of the document management server PC 10. The document management server PC 10 registers the received file (folder) to the specified upload destination folder. Then, the document management server PC 10 returns the result of the registration to the mouse event control unit 313. The result of the registration includes a unique processing result number which indicates whether the registration is normally performed or an error occurred. When the processing result number is determined to be a number indicating an error, the mouse event control unit 313 sets and stores an error code (processing result number) in the bridge data storage unit 314 as error information, and notifies the web browser 400 that the error information has been set.

In step S80, upon reception of the error information setting notification, the web browser 400 acquires the error information from the bridge data storage unit 314, and sets the acquired error information to the content display unit 312. The content display unit 312 displays an error message corresponding to the error code based on the set error information.

Processing in steps S50 to S80 illustrated in FIG. 10 will be described in detail below with reference to the flowcharts.

<Detailed Description of Processing for Acquiring Mouse Event Information (Step S50)>

Figure 11:
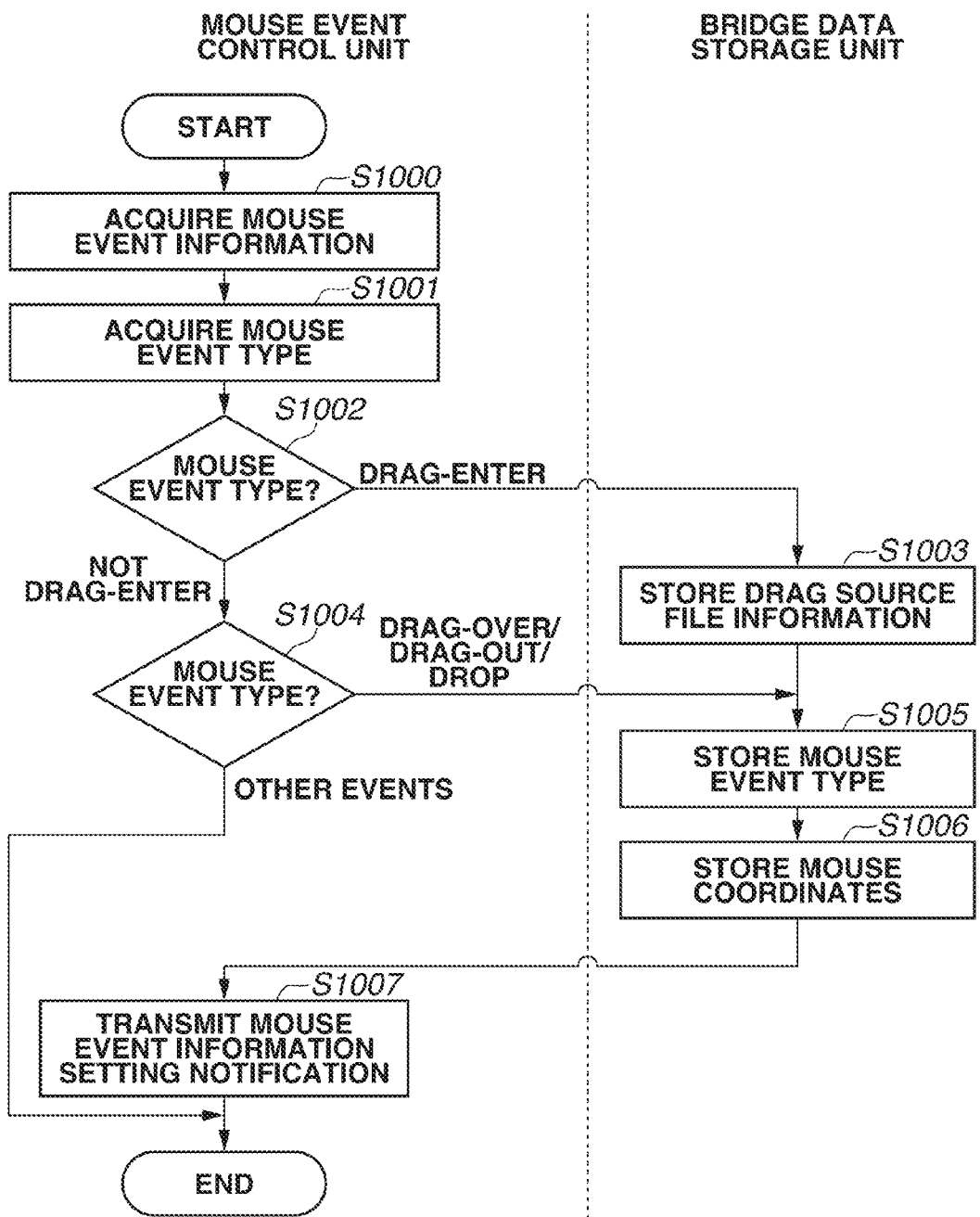
FIG. 11 is a flowchart illustrating processing for notifying a web browser of a mouse event.

FIG. 11 is a flowchart illustrating the processing in which the mouse event control unit 313 acquires mouse event information based on a mouse event from the OS, and stores the mouse event information in the bridge data storage unit 314.

In step S1000, based on a mouse event from the OS, the mouse event control unit 313 acquires mouse event information relating to the main screen 500. In step S1001, the mouse event control unit 313 acquires the mouse event type included in the mouse event information.

In step S1002, the mouse event control unit 313 determines the mouse event type. When the mouse even type is determined to be "drag-enter" (DRAG-ENTER in step S1002), then in step S1003, the mouse event control unit 313 stores, in the bridge data storage unit 314, drag source file information (information of the file currently being dragged) included in the mouse event information.

On the other hand, when the mouse event type is determined to be not "drag-enter" (NOT DRAG-ENTER in step S1002), then in step S1004, the mouse event control unit 313 determines whether the mouse event type is "drag-over", "drag-out", or "drop". When the mouse event type is determined to be any one of "drag-over", "drag-out", and "drop" (DRAG-OVER/DRAG-OUT/DROP in step S1004), the processing proceeds to step S1005. On the other hand, when the mouse event type is determined to be none of "drag-over", "drag-out", and "drop" (OTHER EVENTS in step S1004), the processing exits this flowchart.

In step S1005, the mouse event control unit 313 stores the mouse event type included in the mouse event information in the bridge data storage unit 314. In step S1006, the mouse event control unit 313 acquires the mouse coordinate position included in the mouse event information, converts the mouse coordinate position into relative coordinates by setting the upper left corner of the main screen 500 as the starting point, and stores the relative coordinates in the bridge data storage unit 314. In step S1007, the mouse event control unit 313 notifies the web browser 400 that the mouse event information has been stored in the bridge data storage unit 314.

<Detailed Description of Processing for Detecting Whether Mouse Coordinate Position is Overlapped with Display Position of Folder (Step S60)>

Figure 12:
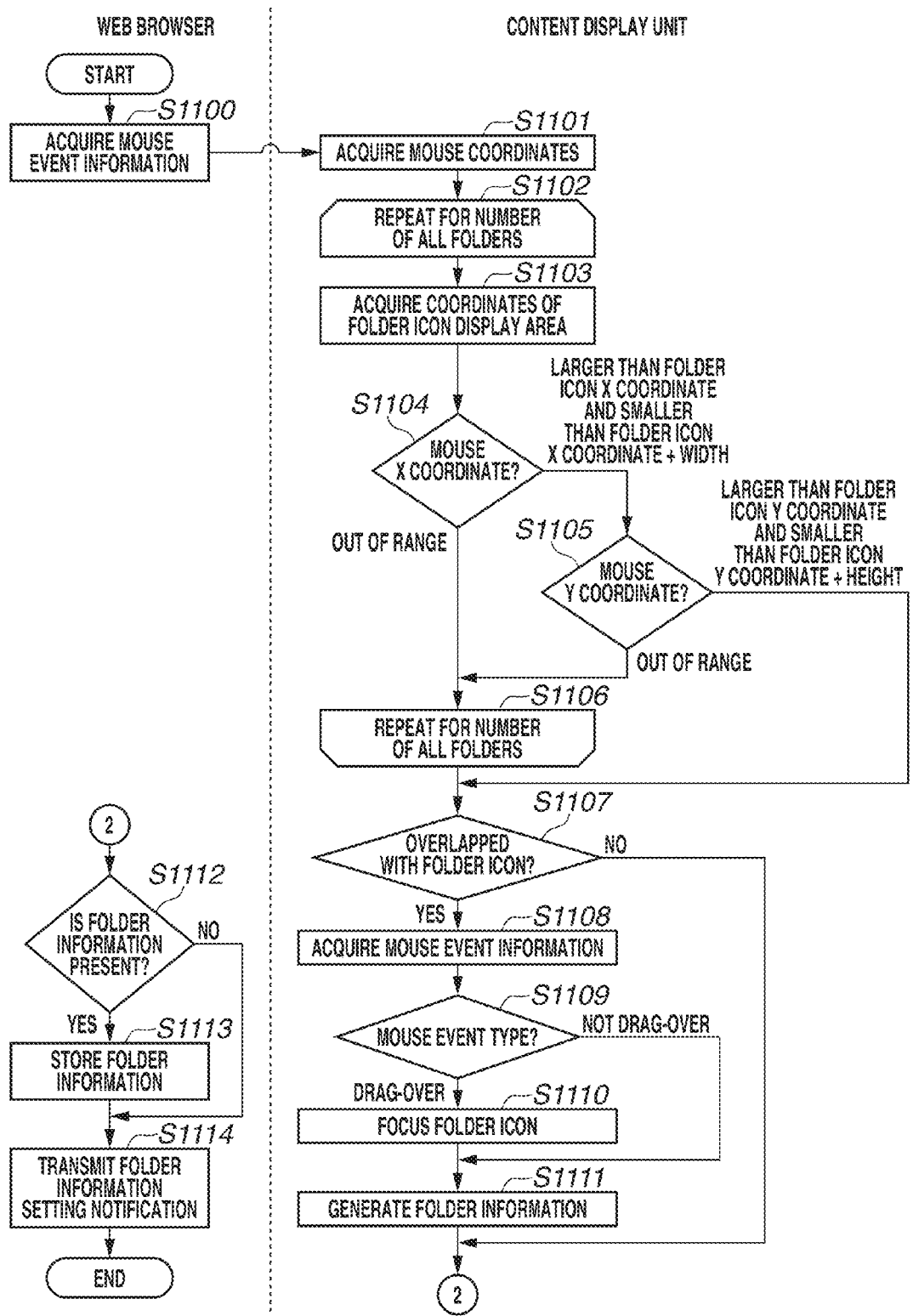
FIG. 12 is a flowchart illustrating processing for detecting a folder at a mouse coordinate position.

FIG. 12 is a flowchart illustrating the processing for detecting a folder whose display position is overlapped with the mouse coordinate position based on the mouse coordinate position included in the mouse event information.

In step S1100, upon reception of a mouse event information storage notification performed in step S1007, the web browser 400 acquires the mouse event information stored in the bridge data storage unit 314, and sets the mouse event information to the content display unit 312.

In step S1101, the content display unit 312 acquires the mouse coordinate position included in the set mouse event information.

Step S1102 illustrated in FIG. 12 indicates the start of a loop. In step S1102, the content display unit 312 repeats the processing in steps S1103 to S1105 for the number of all folders displayed in the tree display area 502 and the content display area 503 as determination target folders.

In step S1103, the content display unit 312 acquires coordinate positions 520 to 540 (illustrated in FIGS. 5C to 5E) of the folder display area 510 for each determination target folder.

In step S1104, the content display unit 312 compares an X coordinate value of the mouse coordinates with an X coordinate range of the folder display area 510 of the determination target folder. When the mouse coordinates are determined to be within the range of the folder display area 510 (LARGER THAN FOLDER ICON X COORDINATE And SMALLER THAN FOLDER ICON X COORDINATE+WIDTH in step S1104), the processing proceeds to step S1105. In step S1105, the content display unit 312 compares a Y coordinate value of the mouse coordinates with a Y coordinate range of the folder display area 510. When the mouse coordinates are determined to be within the range of the folder display area 510 (LARGER THAN FOLDER ICON Y COORDINATE And SMALLER THAN FOLDER ICON Y COORDINATE+HEIGHT in step S1105), the processing exits the loop and then proceeds to step S1107.

Step S1106 illustrated in FIG. 12 indicates the end of the loop. In step S1106, when the mouse coordinates are determined to be outside of the folder display range of the determination target folder (OUT OF RANGE in step S1104 or S1105), the determination target is changed to a next folder, and the processing proceeds to steps S1103 to S1105. When the determination is completed for all of the displayed folders, the content display unit 312 determines that none of the folder display positions is overlapped with the mouse coordinate position, and the processing exits the loop.

In step S1107, the content display unit 312 determines whether the mouse coordinates are overlapped with the display position of a folder. When the mouse coordinate position is determined to be overlapped with the folder display position of (YES in step S1107), then in step S1108, the content display unit 312 acquires the mouse event type included in the mouse event information.

In step S1109, the content display unit 312 determines whether the acquired mouse event type is "drag-over" or "drop". When the acquired mouse event type is determined to be "drag-over" (DRAG-OVER in step S1109), then in step S1110, the content display unit 312 focuses (highlights) the folder whose display position is determined to be overlapped with the mouse coordinates out of the folders displayed in the main screen 500.

On the other hand, when the acquired mouse event type is determined to be "drop" (NOT DRAG-OVER in step S1109), then in step S1111, the content display unit 312 generates folder information of the folder whose display position is determined to be overlapped with the mouse coordinates, and returns the generated folder information to the web browser 400. The folder information generated in this processing collectively includes the name of a folder and a unique ID for identifying the folder (i.e., information for identifying an upload destination folder).

In step S1112, the web browser 400 determines whether the folder information of a folder on which the file was dropped has been returned (i.e., the folder information has been set). When the folder information is determined to have been returned (YES in step S1112), then in step S1113, the web browser 400 stores the folder information in the bridge data storage unit 314.

In step S1114, the web browser 400 notifies the mouse event control unit 313 that the folder information has been stored in the bridge data storage unit 314.

<Detailed Description of Processing for Uploading a File (Step S70)>

Figure 13:
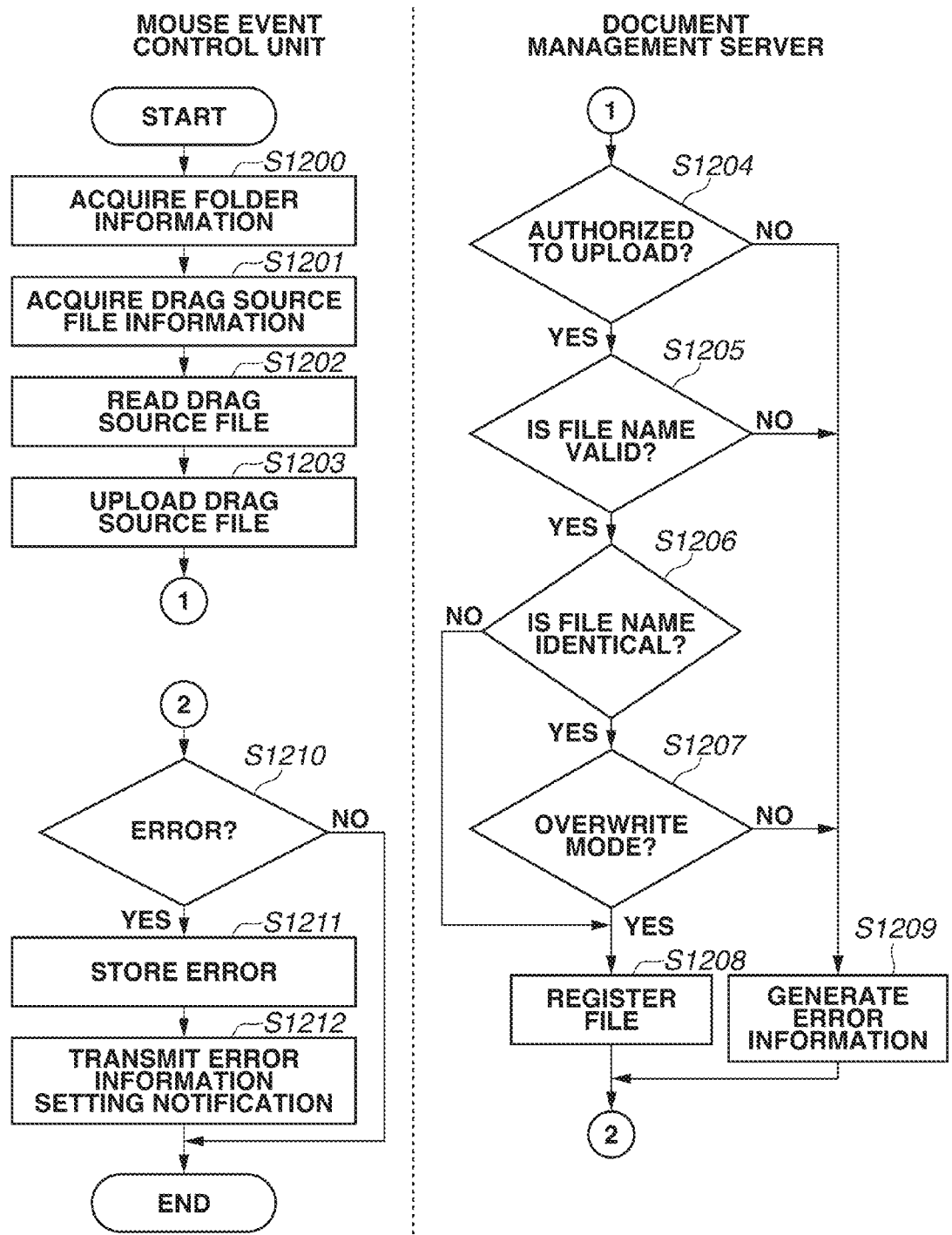
FIG. 13 is a flowchart illustrating processing for uploading a file.

FIG. 13 is a flowchart illustrating the processing in which the mouse event control unit 313 acquires the folder information stored in the bridge data storage unit 314, and uploads the dragged file to the upload destination folder of the document management server PC 10.

In step S1200, the mouse event control unit 313 acquires the folder information (information of the upload destination folder) stored in the bridge data storage unit 314 in step S1113.

In step S1201, the mouse event control unit 313 acquires the drag source file information (information of the drag target file) stored in the bridge data storage unit 314 in step S1003.

In step S1202, the mouse event control unit 313 acquires a file path included in the drag source file information, and reads the target file identified based on the acquired file path.

In step S1203, the mouse event control unit 313 attempts to upload the read target file to the folder identified based on the folder information acquired in step S1200.

In step S1204, the content control unit 302 of the document management server PC 10 determines whether the client PC 20 is authorized to upload a file to the specified folder. When the client PC 20 is determined to be not authorized to upload a file to the specified folder (NO in step S1204), the processing proceeds to step S1209.

On the other hand, when the document management server PC 10 is determined to be authorized to upload a file to the specified folder (YES in step S1204), then in step S1205, the content control unit 302 determines whether an invalid file name is specified to the target file. The invalid file names may be defined as an internal resource or defined in an external file. When the specified file name is determined to be not correct (incorrect file name) (NO in step S1205), the processing proceeds to step S1209.

On the other hand, when the specified file name is determined to be valid (not an invalid file name) (YES in step S1205), then in step S1206, the content control unit 302 determines whether there is a file having the same file name in the upload destination folder. When the content control unit 302 determines that there is no file having the same file name in the upload destination folder (NO in step S1206), the processing proceeds to step S1208. On the other hand, when the content control unit 302 determines that there is a file having the same file name in the upload destination folder (YES in step S1206), the processing proceeds to step S1207.

In step S1207, the content control unit 302 determines whether the file having the same file name existing in the upload destination folder is to be overwritten by the target file. When the file having the same file name is determined to be overwritten (for example, overwrite mode) (YES in step S1207), the processing proceeds to step S1208. On the other hand, when the file having the same file name is determined to be not overwritten (NO in step S1207), the processing proceeds to step S1209.

In step S1208, the content control unit 302 performs registration processing for registering the target file to the upload destination folder, and returns the normal end of the registration to the mouse event control unit 313.

In step S1209, the content control unit 302 generates error information including an error code for identifying the type of an error which has occurred, and returns the error information to the mouse event control unit 313.

In step S1210, the mouse event control unit 313 determines whether the error information has been returned. When the error information is determined to have been returned (YES in step S1210), then in step S1211, the mouse event control unit 313 stores the error information in the bridge data storage unit 314.

In step S1212, the mouse event control unit 313 notifies the web browser 400 that the error information has been stored in the bridge data storage unit 314.

<Processing for Displaying Error Message (Step S80)>

Figure 14:
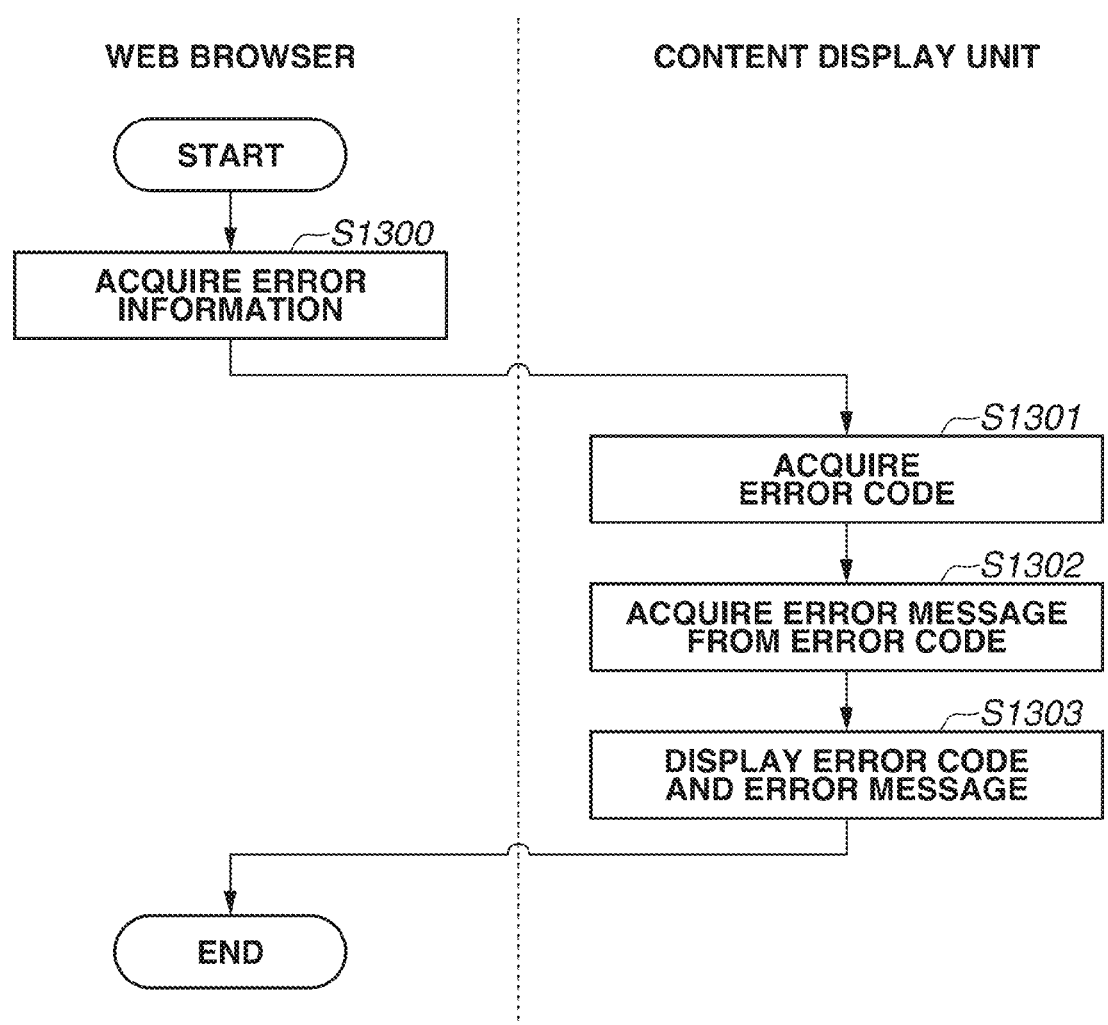
FIG. 14 is a flowchart illustrating processing for displaying an error message when uploading fails.

FIG. 14 is a flowchart illustrating the processing in which the web browser 400 acquires the error information from the bridge data storage unit 314 and sets the error information to the content display unit 312, and the content display unit 312 displays an error message.

Upon reception of the error information storage notification in step S1212 from the mouse event control unit 313, in step S1300, the web browser 400 acquires the error information from the bridge data storage unit 314, and sets the acquired error information to the content display unit 312.

In step S1301, the content display unit 312 acquires the error code included in the set error information.

In step S1302, the content display unit 312 acquires the error message corresponding to the acquired error code. An error message corresponding to each error code may be predefined as an internal resource or defined in an external file.

In step S1303, the content display unit 312 displays the error code and the error message on the screen.

As described above, the user can easily switch between content download processing and content upload processing through the D&D operation.

An overview of processing procedure performed by a system according to a second exemplary embodiment of the present invention will be described below with reference to FIG. 15.

A certain document management server has a version management function of storing previous versions of each file. In the first exemplary embodiment, since files of the latest version existing under each folder are considered in the processing illustrated in FIG. 7, downloading of previous file versions is not taken into consideration. In the second exemplary embodiment, downloading of previous file versions will be described. In the second exemplary embodiment, an extended version of the processing illustrated in FIG. 7 is used, and other elements are similar to those in the first exemplary embodiment. Only elements different from those in the first exemplary embodiment will be described below with reference to the flowcharts.

<Processing for Displaying Previous Content Versions (Step S1400)>

Figure 15:
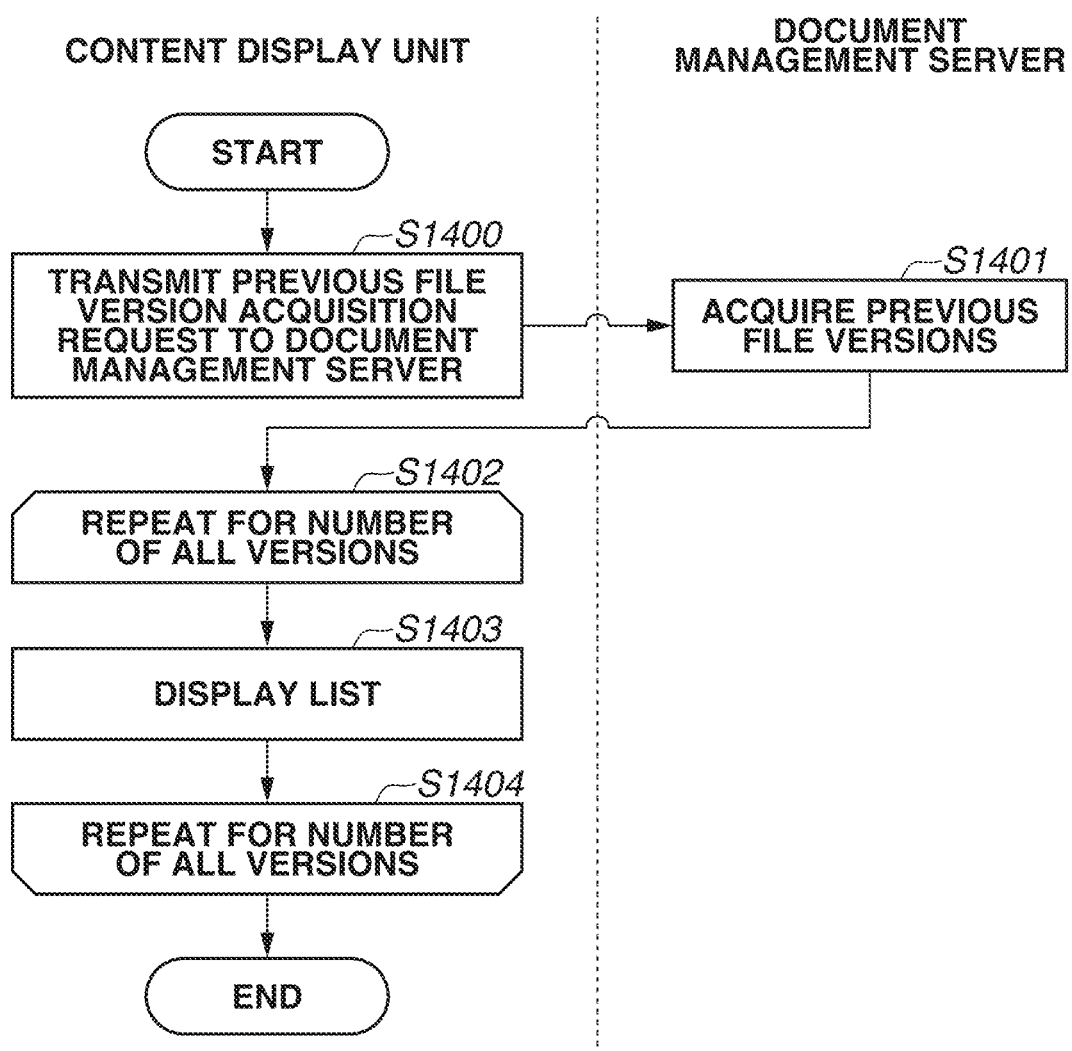
FIG. 15 is a flowchart illustrating processing for displaying previous file versions according to a second exemplary embodiment.

FIG. 15 is a flowchart illustrating the processing performed when displaying of previous versions of the file displayed in the processing illustrated in FIG. 7 is instructed by the user. The content display unit 312 acquires previous versions of file information of a specific file from the document management server PC 10, and displays each version of the file in the main screen 500 on the web browser 400.

In step S1400, the content display unit 312 generates request information for acquiring information about previous versions of a file specified by the user, and transmits a previous version acquisition request for the file to the document management server PC 10.

In step S1401, upon reception of the previous version acquisition request, the document management server PC 10 acquires file information of previous versions of the specified file from the content control unit 302. Then, the document management server PC 10 transmits the acquired previous versions of file information to the content display unit 312 as a response.

Step S1402 illustrated in FIG. 15 indicates the start of a loop. In step S1402, the content display unit 312 repeats the processing in step S1403 for the number of all received previous file versions of the processing target in order. In step S1403, the content control unit 312 displays the file information of previous file versions of the processing target in the content display area 502 in the list format. Step S1404 illustrated in FIG. 15 indicates the end of the loop. In S1404, when the processing in step S1403 is completed for the number of all received previous versions, the processing exits the loop and then exits the flowchart illustrated in FIG. 15.

When the D&D operation is performed on the icon of previous file versions displayed by the processing illustrated in FIG. 15, the user, by performing similar processing to the processing in steps S20 to S30 illustrated in FIG. 6 according to the first exemplary embodiment, can download previous file versions displayed by the RIA through a D&D operation.

In the first and the second exemplary embodiments, update time and date of the file downloaded by the processing illustrated in FIG. 9 in the file system of the OS is the time and date when downloading is executed. Therefore, the update time and date of the downloaded file differs from the update time and date managed by the document management server PC 10. On the other hand, in a third exemplary embodiment, an extended version of the processing illustrated in FIG. 9 is used, and other elements are similar to those in the first and the second exemplary embodiments. An overview of the processing procedure of the system according to the third exemplary embodiment of the present invention will be described below with reference to FIG. 16.

Figure 16:
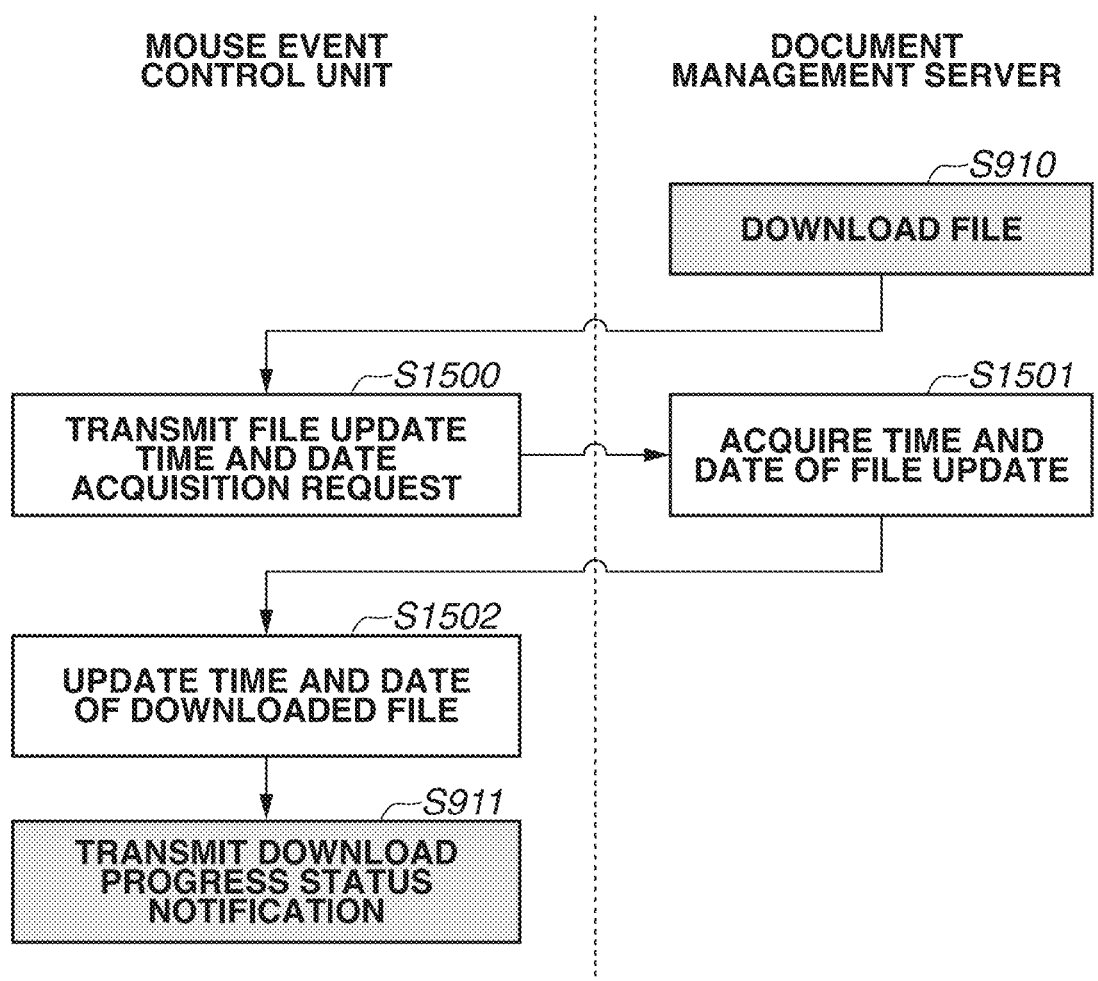
FIG. 16 is a flowchart illustrating processing for updating time and date of a downloaded file according to a third exemplary embodiment.

FIG. 16 illustrates an extended version of the processing in steps S910 to S911 of the flowchart illustrated in FIG. 9. FIG. 16 is a flowchart illustrating the processing for matching the update time and date of a downloaded file with the update time and date managed by the document management server PC 10. Specifically, additional steps (steps S1500 to S1502) are inserted between steps S910 and S911 of the flowchart illustrated in FIG. 9.

In step S1500, the mouse event control unit 313 specifies the URL of the downloaded file acquired in step S902 to the document management server PC 10, and transmits an update time and date acquisition request for the file to the document management server PC 10.

In step S1501, the document management server PC 10 acquires the update time and date, which is managed by the document server PC10, of the file identified by the received URL, and returns the acquired update time and date for the mouse event control unit 313.

In step S1502, the mouse event control unit 313 applies the received update time and date of the file to the downloaded file.

In the first exemplary embodiment, the folder in the file system of the OS on the client PC 20 is the drop destination folder to which the file is downloaded. In a fourth exemplary embodiment, a widget-like program for accepting a file drop operation arranged on the desktop of the client PC 20 will be described below. For example, a function of printing a file dropped on the widget and any other functions may be provided as widget functions. Alternatively, a widget having functions other than the above-described functions can be used. An overview of processing procedure of the system according to the fourth exemplary embodiment will be described below with reference to FIG. 17.

Figure 17:
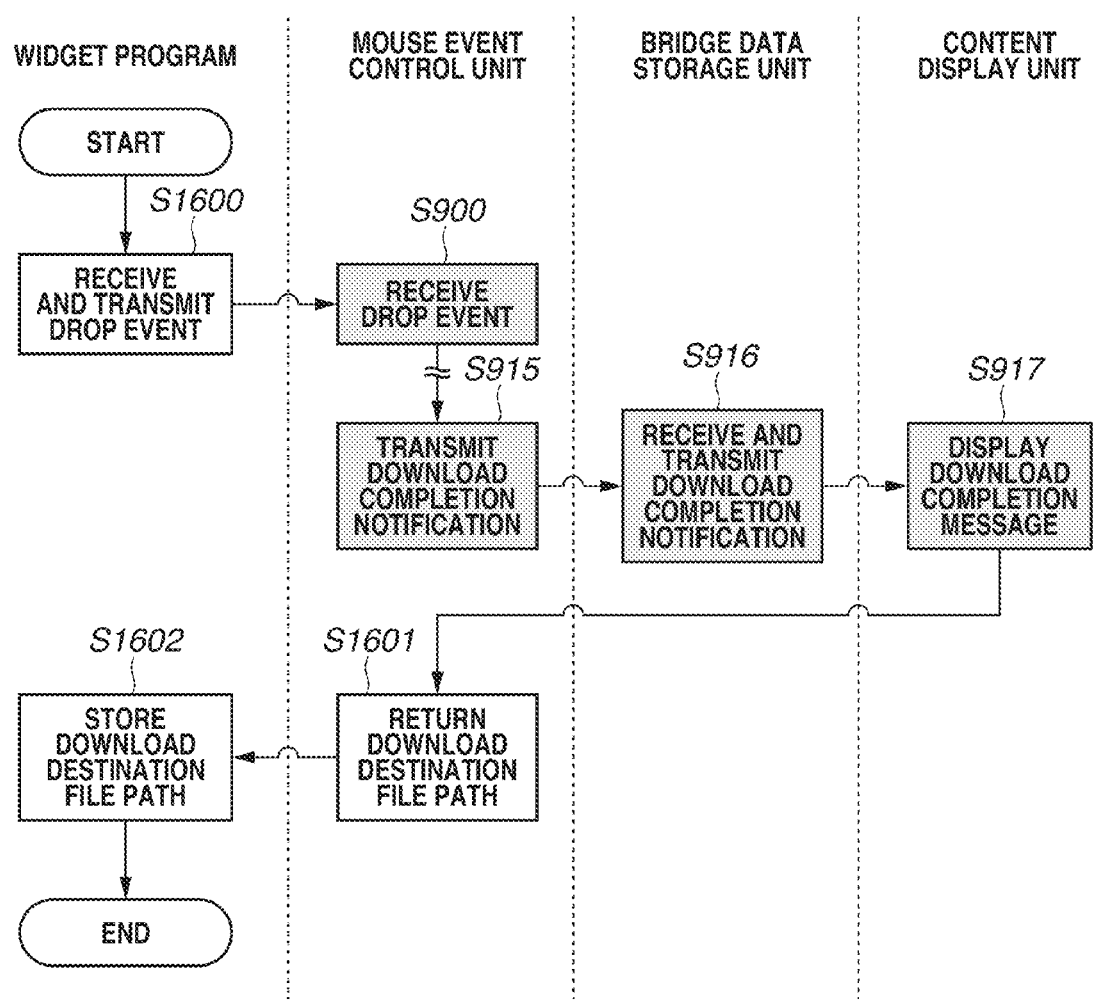
FIG. 17 is a flowchart illustrating processing performed by a widget program to acquire a content according to a fourth exemplary embodiment.

FIG. 17 is a flowchart, of an extended version of the flowchart illustrated in FIG. 9, illustrating the processing for downloading a content to a widget program when the content is dropped onto the widget arranged on the desktop of the client PC 20. Only elements different from those in the flowchart illustrated in FIG. 9 will be described below.

Referring to the flowchart illustrated in FIG. 17, step S1600 has been added before step S900, and steps S1601 to S1602 have been added after step S917 of the flowchart illustrated in FIG. 9.

In step S1600, upon reception of a drop event of the mouse, the widget program transmits a drop event indicating that the drop operation has been performed to the mouse event control unit 313. Processing in steps S900 to S915 is similar to those in the flowchart illustrated in FIG. 9, and redundant description thereof will be omitted.

In step S1601, the mouse event control unit 313 returns, to the widget program, the file path of the file downloaded to the client PC 20.

In step S1602, the widget program stores the received file path and uses the stored file path to operate the file downloaded to the client PC 20. For example, if the widget program has a file print function, the widget program can identify and print the file based on the file path.

The present invention is implemented also when software (programs) for implementing the functions of the above-described exemplary embodiments is supplied to a system or an apparatus via a network or various storage media, and a computer (or a CPU or a microprocessor unit (MPU)) of the system or apparatus reads and executes the programs.

According to the present invention, a content displayed by the RIA executed on a web browser is dragged and dropped onto a folder managed by a program different from the web browser (such as the file system of an OS) through a D&D operation, the content managed by a server can be easily downloaded.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-159179 filed Jul. 31, 2013, which is hereby incorporated by reference herein in its entirety.

What is claimed is:

1. A non-transitory storage medium storing a document management program including a first extension program and a second extension program operating on a web browser, wherein the first extension program causes a computer to function as:
  a first acquisition unit configured to acquire, from a document management server, information of a content that is managed by the document management server, the acquired information of the content including a name of the content and a path of the content;
  a display unit configured to display a screen in a display area, wherein the display area is defined according to a description of an HTML web page by the web browser, and wherein the screen hierarchically displaying the name of the content according to the path of the content is defined based on the acquired information of the content by the first extension program, and wherein the acquired information of the content and the screen are not included in the description of the HTML web page; and
  a first storage unit configured to, when mouse event information which occurred on the web browser is determined to be drag-out indicating that the information of the content hierarchically displayed in the screen has been dragged outside the display area, transmit the dragged information of the content to be stored in a bridge data storage unit,
  wherein the second extension program causes the computer to function as:
  a monitoring unit configured to receive the information of the content stored in the bridge data storage unit, generate a drag object including the received information of the content, and monitor whether the drag object has been dropped outside the web browser; and
  a downloading unit configured to, when the drag object is dropped outside the web browser, execute download processing by instructing the document management server to transmit a corresponding content based on the information of the content included in the drag object.

2. The non-transitory storage medium according to claim 1, wherein the content is at least any one of a file and a folder.

3. The non-transitory storage medium according to claim 1, wherein the information of the content stored in the bridge data storage unit is URI information of the content.

4. The non-transitory storage medium according to claim 1, wherein the drag object is registered to an OS so that the monitoring unit monitors whether the drag object has been dropped outside the web browser.

5. The non-transitory storage medium according to claim 1, wherein, when the dragged content is a folder, the downloading unit acquires information of files included under the folder from the document management server based on information of the folder included in the dropped drag object, and performs the download processing by instructing the document management server to transmit the files based on the acquired information of files.

6. The non-transitory storage medium according to claim 1, wherein the display unit displays content of a previous content version managed by the document management server in the display area defined on the web browser, and wherein the content to be dragged is the content of the previous content version.

7. The non-transitory storage medium according to claim 1, wherein the downloading unit acquires from the document management server the update time and date of the content managed by the document management server, and, by using the acquired update time and date of the content managed by the document management server, updates time and date of the downloaded content.

8. The non-transitory storage medium according to claim 1, wherein, when the drop destination of the drag object is a widget program, the downloading unit notifies the widget program of the file path of the downloaded content.

9. The non-transitory storage medium according to claim 1, wherein, when a mouse event at a time of starting a drag operation is a drag operation for a file displayed outside the web browser, and when the file displayed outside the web browser is dropped onto a content in the display area displayed by the display unit, upload processing for the dragged file is performed.

10. An information processing apparatus including a computer-readable storage medium storing a first extension program and a second extension program operating on a web browser, and a CPU for executing a program of the web browser, the first extension program, and the second extension program, wherein the first extension program causes the CPU to function as:
  a first acquisition unit configured to acquire, from a document management server, information of a content that is managed by the document management server, the acquired information of the content including a name of the content and a path of the content;
  a display unit configured to display a screen in a display area, wherein the display area is defined according to a description of an HTML web page by the web browser, and wherein the screen hierarchically displaying the name of the content according to the path of the content is defined based on the acquired information of the content by the first extension program, and wherein the acquired information of the content and the screen are not included in the description of the HTML web page; and
  a first storage unit configured to, when mouse event information which occurred on the web browser is determined to be drag-out indicating that the information of the content hierarchically displayed in the screen has been dragged outside the display area, transmit the dragged information of the content to be stored in a bridge data storage unit,
  wherein the second extension program causes the CPU to function as:
  a monitoring unit configured to receive the information of the content stored in the bridge data storage unit, generate a drag object including the received information of the content, and monitor whether the drag object has been dropped outside the web browser; and
  a downloading unit configured to, when the drag object is dropped outside the web browser, execute download processing by instructing the document management server to transmit a corresponding content based on the information of the content included in the drag object.

* * * * *